United States Patent
Schober et al.

(10) Patent No.: US 10,836,408 B2
(45) Date of Patent: Nov. 17, 2020

(54) VEHICLE HEAD WITH REDUCED CROSSWIND SENSITIVITY

(75) Inventors: Martin Schober, Berlin (DE);
Alexander Orellano, Berlin (DE);
Andreas Tietze, Berlin (DE); Marco Weise, Berlin (DE); Stefan Steilen, Berlin (DE)

(73) Assignee: Bambardier Transportation GmbH, Berlin (DE)

( * ) Notice: Subject to any disclaimer, the term of this patent is extended or adjusted under 35 U.S.C. 154(b) by 502 days.

(21) Appl. No.: 13/643,726

(22) PCT Filed: Apr. 28, 2011

(86) PCT No.: PCT/EP2011/056759
§ 371 (c)(1),
(2), (4) Date: Feb. 6, 2013

(87) PCT Pub. No.: WO2011/135033
PCT Pub. Date: Nov. 3, 2011

(65) Prior Publication Data
US 2013/0133545 A1    May 30, 2013

(30) Foreign Application Priority Data

Apr. 29, 2010  (EP) .................................... 10161538
Jul. 1, 2010   (EP) .................................... 10168073

(51) Int. Cl.
*B61D 17/02*        (2006.01)

(52) U.S. Cl.
CPC ............... *B61D 17/02* (2013.01); *Y02T 30/00* (2013.01)

(58) Field of Classification Search
CPC .......... B61D 17/02; Y02T 30/32; Y02T 30/00
(Continued)

(56) References Cited

U.S. PATENT DOCUMENTS

| 3,972,556 A | * | 8/1976 | Mason, Jr. ........... B62D 35/001 105/1.2 |
| 4,018,472 A | * | 4/1977 | Mason, Jr. ........... B62D 35/001 105/1.2 |

(Continued)

FOREIGN PATENT DOCUMENTS

| DE | 2554488 A1 | 6/1977 |
| DE | 19600038 A1 | 7/1996 |

(Continued)

OTHER PUBLICATIONS

"efSET—Innovative high-speed rolling stock for overseas markets", Kawasaki Technical Review, Sep. 2010, vol. 170, p. 13-20.
(Continued)

*Primary Examiner* — Zachary L Kuhfuss
(74) *Attorney, Agent, or Firm* — The Webb Law Firm

(57) ABSTRACT

A vehicle having a wagon body which is supported on at least one running gear, wherein the wagon body defines a vehicle longitudinal direction, a vehicle transverse direction and a vehicle height direction. The wagon body has a body section and an adjacent head section. The head section has an outer skin and a flow separation unit for reducing sensitivity of the vehicle to crosswind. The flow separation unit comprises a roof-like protrusion formed by the outer skin. The roof-like protrusion has a first roof section, a second roof section, and a ridge section forming a transition between the first roof section and the second roof section. The first roof section and the second roof section run inclined to one another such that, the ridge section forms a flow separation edge for the air flow.

17 Claims, 9 Drawing Sheets

(58) Field of Classification Search
USPC .......................................... 105/1.1, 1.2, 1.3
See application file for complete search history.

(56) References Cited

U.S. PATENT DOCUMENTS

| | | | |
|---|---|---|---|
| 4,208,197 A * | 6/1980 | Yakimowich | B01D 50/00 296/180.2 |
| 4,245,862 A * | 1/1981 | Buckley, Jr. | B62D 35/001 296/180.3 |
| 4,354,648 A | 10/1982 | Schenk et al. | |
| D343,819 S * | 2/1994 | Meryman | D12/181 |
| 6,945,176 B2 * | 9/2005 | Santti et al. | 105/3 |
| 8,215,239 B2 * | 7/2012 | Iden | 105/1.1 |

FOREIGN PATENT DOCUMENTS

| | | |
|---|---|---|
| EP | 0008147 A1 | 2/1980 |
| GB | 1564970 | 4/1980 |

OTHER PUBLICATIONS

Jollyroger, "Italian regional diesel convoy Alstom AI502 "Minuetto" at Santhia (TO), Italy", Wikimedia Commons, Apr. 11, 2006, vol. 3, p. 1-3, page last updated on Sep. 29, 2009.
"Dieselhydraulischer Triebwagen 'Minuetto' mit RailPack", Voith, www.voithturbo.com, Apr. 2008.
"Spanien: zwei neue Hochgeschwindigkeitsstrecken", Eisenbahn-Revue, Jan. 2008, p. 35.

* cited by examiner

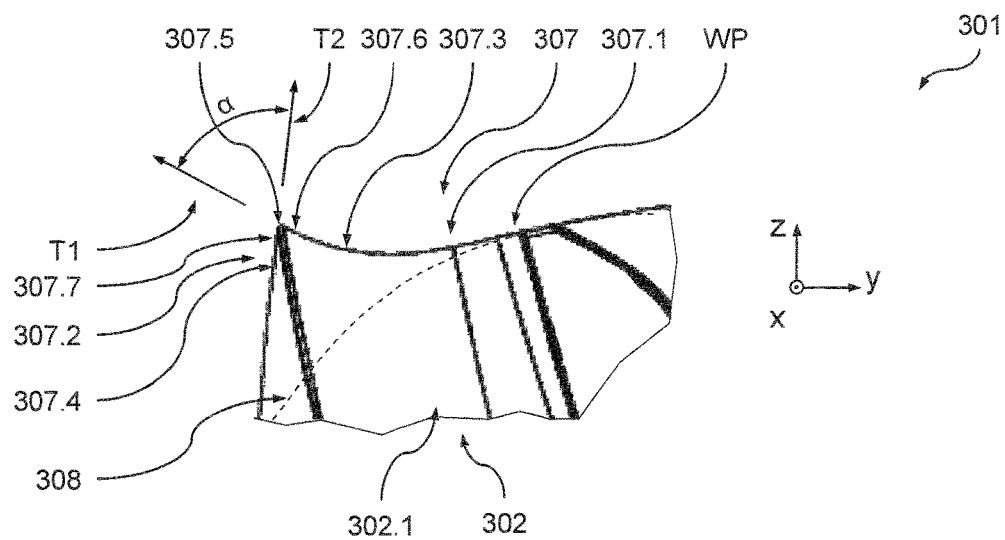
Fig. 17
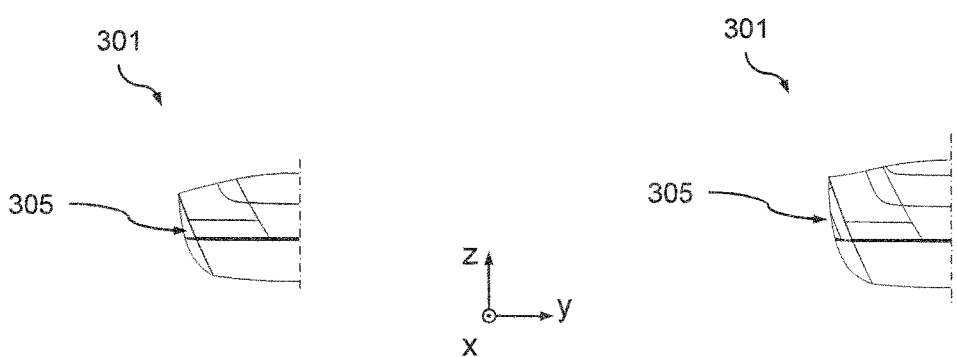
Fig. 18A
Fig. 18B
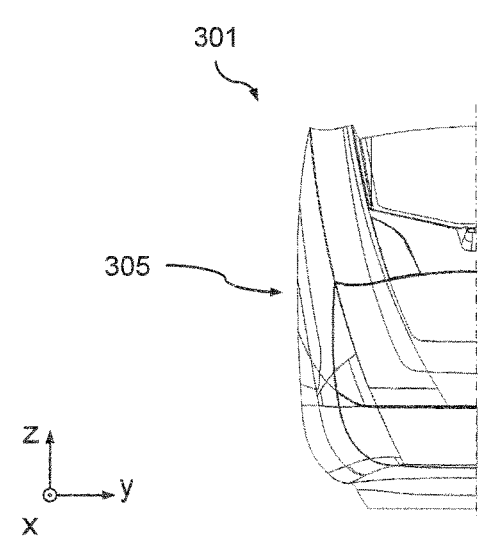
Fig. 18C
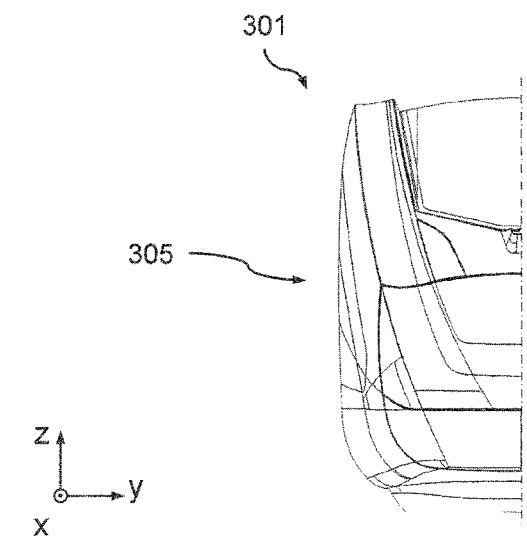
Fig. 18D

VEHICLE HEAD WITH REDUCED CROSSWIND SENSITIVITY

BACKGROUND OF THE INVENTION

Field of the Invention

The present invention relates to a vehicle, in particular a rail vehicle for high-speed traffic, having a wagon body which is supported on at least one running gear, wherein the wagon body defines a vehicle longitudinal direction, a vehicle transverse direction and a vehicle height direction, wherein the wagon body has a body section and an adjacent head section. The head section is configured such that, in operation, it forms a free vehicle end, wherein, at least in the vehicle height direction, the head section tapers along the vehicle longitudinal direction towards the free vehicle end. The head section further has an outer skin and a flow separation unit that extends in the vehicle longitudinal direction and/or the vehicle height direction, for reducing the sensitivity of the vehicle to crosswind.

Description of the Related Art

With of modern rail vehicles having comparatively high nominal operating speeds and/or a comparatively pronounced overall height (such as is required for example with double-decker vehicles), the problem frequently arises that they have a high so-called crosswind sensitivity. With these vehicles, if there is an oblique flow against the wagon body, caused for example by a crosswind (that is to say a flow deviating from a flow parallel to the direction of travel or the longitudinal axis of the vehicle), as the speed of the flow increases and/or as the deviation from flow parallel to the direction of travel increases, this results among other things in an unfavourable pressure distribution at the leading tip of the vehicle. This unfavourable pressure distribution causes among other things an upward force and in some cases a rolling moment in the region of the vehicle tip, which in some cases may result in a considerable wheel unloading at the running gear adjacent to the vehicle tip.

In such cases, the wheel unloading in the event of crosswind may be so pronounced that, for example, the criteria for crosswind stability defined in national or international standards or operating regulations are no longer complied with. For example, Directive 96/48/EC on the interoperability of the trans-European high-speed rail system, in the subsystem on "vehicles" (often also called TSI RS), specifies as a stability criterion for certain vehicles having certain nominal operating speeds that the maximum average wheel unloading of the most critical running gear shall not exceed 90% of the static axle loads of the running gear (see TSI RS, Annex G.5.4.1).

In particular when the end vehicles in a train are comparatively light, in particular with so-called control cars, which have no or only little heavy operating equipment (in particular drive equipment such as main transformers, etc.), a stability criterion of this kind may quickly be breached. The result is either that the weight of a vehicle of this kind and hence the axle loads on the running gear concerned have to be increased and, in addition or as an alternative, the speed of travel has to be reduced once a certain crosswind strength is reached. Of course, both are undesirable from an economic point of view.

In this context, DE 25 54 488 C3 proposes a generic vehicle in which flow separation units are provided, borne movably on the vehicle head, which in the event of crosswind produce a flow separation which counters the development of the above-described unfavourable pressure distribution at the vehicle head. With a normal flow, parallel to the direction of travel, these flow separation units are supposed to be deactivated and integrated seamlessly into the smooth, rounded outer skin of the wagon body in order to avoid the disadvantageous effects of these flow separation units with respect to sound emission of the vehicle (in particular at high speeds) and the flow resistance of the vehicle.

Although this construction makes it possible to reduce the negative effects of an oblique flow in the event of crosswind, it has the disadvantage that it is comparatively complex and requires intensive maintenance.

SUMMARY OF THE INVENTION

It is therefore the object of the present invention to provide a vehicle of the type mentioned at the outset which does not entail the above-mentioned disadvantages, or at least does so to a lesser extent, and which, in particular, makes it possible in a simple manner to increase the crosswind stability of the vehicle.

The present invention is based on the technical teaching that the crosswind stability of the vehicle can be increased in a simple manner without significantly increasing sound development at high speeds or the flow resistance of the vehicle, if there is provided at the vehicle head a substantially rigid, roof-like protrusion which is integrated in the outer skin of the vehicle and which, in the event of an oblique flow against the vehicle, is arranged on the lee side of the vehicle longitudinal centre plane and there forms a flow separation edge for the air flow by means of its ridge section, such that the flow at this point separates from the outer skin.

The roof-like protrusion is preferably such pronouncedly shaped that, preferably, at all the travel speeds that are achievable in normal operation of the vehicle and in the event of a correspondingly strong crosswind, a reliable and enduring separation of the flow from the outer skin is guaranteed, and accordingly the possibility that the flow re-attaches to the outer skin is reliably prevented.

This makes an advantageous reduction in the crosswind sensitivity of the vehicle possible. Here, it has moreover been shown that the roof-like protrusion may be configured and arranged such that, even at high speeds of travel, there is no significant increase in the sound development at the flow separation edge and also no significant increase in the flow resistance of the vehicle. A roof-like protrusion of this kind may moreover be integrated in the outer skin of the wagon body, for example laterally outside a windscreen, without major expense, with the result that the manufacturing costs for the vehicle are not noticeably increased.

According to one aspect, the present invention therefore relates to a vehicle, in particular a rail vehicle for high-speed traffic, having a wagon body which is supported on at least one running gear, wherein the wagon body defines a vehicle longitudinal direction, a vehicle transverse direction and a vehicle height direction. The wagon body has a body section and an adjacent head section. The head section is configured to form a free vehicle end during operation, wherein the head section, along the vehicle longitudinal direction, tapers at least in the vehicle height direction towards the free vehicle end. The head section further has an outer skin and a flow separation unit extending in the vehicle longitudinal direction and/or the vehicle height direction for reducing sensitivity of the vehicle to crosswind. The flow separation unit comprises a roof-like protrusion formed by the outer skin, wherein the roof-like protrusion is spaced in the vehicle transverse direction from a vehicle longitudinal centre plane. The roof-like protrusion has a first roof section facing towards the vehicle longitudinal centre plane, a second roof section facing away from the vehicle longitudinal centre plane and a ridge section forming a transition between the first roof section and the second roof section. The first roof section and the second roof section run inclined to one another such that, at a nominal operating speed of the rail vehicle and with an oblique flow against the roof-like protrusion by an air flow, in particular caused by crosswind, coming from the vehicle longitudinal centre plane, the ridge section forms a flow separation edge for the air flow.

It should be mentioned at this point that the term nominal operating speed, in the context of the present invention, should be understood to mean the maximum speed of the vehicle relevant to the design and certification of the vehicle that is or may be maintained over a longer period in normal operation of the vehicle.

In principle, the roof sections and the ridge section of the roof-like protrusion may be of any suitable construction provided that it is ensured that, in the region of the ridge section, a flow separation edge is formed ensuring reliable and enduring separation of the air flow in the event of oblique flow against the vehicle or the wagon body. In particular, both the first roof section and the second roof section (in a sectional plane perpendicular to the vehicle longitudinal direction) may have an sectional contour which is at least section-wise rectilinear, and/or is at least section-wise arbitrarily curved. Here, it is only required that the first roof section and the second roof section are arranged in relation to one another such that, under an oblique flow against the vehicle, a main direction of flow is imposed on the air flow, by the first roof section in the region close to the boundary layer, wherein the sectional contour in the region of the second roof section (in the main direction of flow downstream of the ridge section) kinks or falls away that sharply or in the manner of a cliff, respectively, in relation to the main direction of flow such that the air flow is unable to follow this rapid change in direction of the sectional contour and is consequently enduringly separated from the outer skin.

This rapid change in direction of the sectional contour along the main direction of flow in the region close to the boundary layer may be achieved in any desired way by a corresponding shaping of the outer skin of the wagon body. It should be noted here that the outer skin of the wagon body in particular need not necessarily follow the main direction of flow precisely at every point. Rather, local deviations in the sectional contour of the outer skin from this main direction of flow are possible (caused for example by irregularities in the outer skin in the form of local ribs, edges or dents, etc.), in the region of which the boundary layer and, where applicable, the part of the flow close to the boundary layer take a direction deviating from the main direction of flow. It is necessary only to ensure that these local deviations have no effect on the global direction of the flow (and consequently also the main direction of flow) in the region close to the boundary layer.

In preferred variants on the vehicle according to the invention, the first roof section is configured to impose, in a vehicle transverse plane running perpendicular to the vehicle longitudinal direction, in a first region adjacent to the ridge section, and upon a flow in the vehicle transverse direction coming from the vehicle longitudinal centre plane a first tangential direction on the air flow, while the second roof section is configured to impose, in the vehicle transverse plane, in a second region adjacent to the ridge section, and upon a flow in said vehicle transverse direction towards said vehicle longitudinal centre plane, a second tangential direction on the air flow. Here, the first tangential direction and the second tangential direction define a roof angle (between the two roof sections) of the roof-like protrusion. In order to achieve the described rapid change in direction in the sectional contour and hence the desired enduring flow separation, the roof angle, over a first edge region extending in the vehicle longitudinal direction, is less than 150°, preferably less than 130°, and more preferably less than 120°. Preferably, the roof angle is less than 110°, more preferably less than 100°. Particularly favourable results can be achieved if the roof angle is 70° to 110°.

It should again be mentioned that the outer skin of the wagon body in the respective adjacent region need not necessarily have a smooth, for example an evenly curved, contour. Rather, local deviations (such as local ribs, edges, dents, etc.) are possible, provided that the respective tangential direction is imposed on the respective flow as the main direction of flow in the region close to the boundary layer.

In the case of further preferred variants on the vehicle according to the invention, in particular in the case of variants having a substantially smooth outer skin (which has, for example, in each case an at most moderate change in the curvature in the region adjacent the ridge section), the first roof section, in a vehicle transverse plane running perpendicular to the vehicle longitudinal direction and in a first region adjacent the ridge section, defines a first tangential direction, while the second roof section, in the vehicle transverse plane and in a second region adjacent the ridge section, defines a second tangential direction, wherein the first tangential direction and the second tangential direction once again define a roof angle (between the two roof sections) of the roof-like protrusion. In order, here too, to achieve the described rapid change in direction in the sectional contour and, hence, the desired enduring flow separation, the roof angle, over a first edge region extending in the vehicle longitudinal direction, is less than 150°, preferably less than 130°, and more preferably less than 120°. Preferably, the roof angle is less than 110°, more preferably less than 100°. Particularly favourable results can be achieved if the roof angle is 70° to 110°.

The extent of the roof-like protrusion over the head section may in principle be selected to be of any suitable amount in the three vehicle directions provided it produces the desired reduction in the crosswind sensitivity of the vehicle. For example, it may be sufficient to provide a relatively short roof-like protrusion, provided the latter extends over a region of the vehicle which is particularly critical for crosswind sensitivity. The position and length (along the ridge section) of the roof-like protrusion may in this case depend, in particular, on the nominal operating speed of the vehicle. The part of the roof-like protrusion which results in an enduring flow separation will move further away from the vehicle tip, in the vehicle longitudinal direction, in different vehicles having different nominal operating speeds, generally as the nominal operating speed of the respective vehicle increases (the part of the roof-like protrusion which results in an enduring flow separation consequently lies further away from the vehicle tip in a vehicle having a higher nominal operating speed than it does in a vehicle having a relatively low nominal operating speed).

In preferred variants of the vehicle according to the invention, the head section, in the vehicle longitudinal direction, has a maximum head length between the free vehicle end and an interface to the body section, wherein the transition from the head section to the body section is typically defined by the point along the vehicle longitudinal direction at which a region of the wagon body begins which is substantially prismatic over the entire periphery, that is to say the region in which (apart from recesses for integrated equipment such as current collectors, or projecting equipment such as roof-mounted containers) there is, in the vehicle longitudinal direction, no longer any substantial change in the cross-section perpendicular to the vehicle longitudinal direction.

In such cases, the first edge region, in the vehicle longitudinal direction, extends over at least 15% of the maximum head length. Preferably, the first edge region extends over at least 20% of the maximum head length. Particularly favourable results have been achieved in respect of reducing the crosswind sensitivity with low sound emission and low flow resistance in the direction of travel if the first edge region extends over 25% to 50% of the maximum head length.

In addition or as an alternative, it is provided for the first edge region to begin at a first relative longitudinal spacing from the free vehicle end in the vehicle longitudinal direction, which is at least 2% of the maximum head length. Preferably, the first relative longitudinal spacing is at least 5% of the maximum head length, and more preferably at least 15% of the maximum head length. Here too, it is generally the case that the first relative longitudinal spacing preferably increases for different vehicles as the nominal operating speed of the respective rail vehicle increases (and consequently the first relative longitudinal spacing is greater in a vehicle having a higher nominal operating speed than it is in a vehicle having a lower nominal operating speed).

In addition or as an alternative, it is further provided for the first edge region to end at a second relative longitudinal spacing from the free vehicle end in the vehicle longitudinal direction, which is at most 80% of the maximum head length. Preferably, the second relative longitudinal spacing is at most 65% of the maximum head length, and more preferably at most 50% of the maximum head length, wherein the second relative longitudinal spacing also generally increases for different vehicles as the nominal operating speed of the rail vehicle increases (and consequently the second relative longitudinal spacing is greater in a vehicle having a higher nominal operating speed than it is in a vehicle having a lower nominal operating speed).

As far as the placement and position of the roof-like protrusion in the height direction of the vehicle are concerned, comparable boundary conditions apply. Thus, the head section, in the vehicle height direction, has a maximum head height between a vehicle lower edge and a vehicle upper edge, wherein, in the vehicle height direction, the first edge region preferably extends over at least 10% of the maximum head height, preferably over at least 30% of the maximum head height. Particularly favourable results have been achieved in respect of reducing the crosswind sensitivity with low sound emission and low flow resistance in the direction of travel, if the first edge region, in the vehicle height direction, extends over 25% to 60% of the maximum head height.

In addition or as an alternative, it is provided for the first edge region to begin at a first relative vertical spacing from the vehicle lower edge in the vehicle height direction, which is at least 15% of the maximum head height. Preferably, the first relative vertical spacing is at least 20% of the maximum head height, and more preferably at least 40% of the maximum head height. Here too, it is generally the case that the first relative vertical spacing increases for different vehicles as the nominal operating speed of the rail vehicle increases (and consequently the first relative vertical spacing is greater in a vehicle having a higher nominal operating speed than it is in a vehicle having a lower nominal operating speed).

In addition or as an alternative, it is further provided for the first edge region to end at a second relative vertical spacing from the vehicle lower edge in the vehicle height direction, which is at most 85% of the maximum head height. Preferably, the second relative vertical spacing is at most 75% of the maximum head height, and more preferably at most 65% of the maximum head length. Here too, it is generally the case that the second relative vertical spacing increases for different vehicles as the nominal operating speed of the rail vehicle increases (and consequently the second relative vertical spacing is greater in a vehicle having a higher nominal operating speed than it is in a vehicle having a lower nominal operating speed).

As far as the placement and position of the roof-like protrusion in the transverse direction of the vehicle are concerned, comparable boundary conditions again apply. Thus, the head section has a maximum head width in the vehicle transverse direction, and in the vehicle transverse direction the first edge region extends over at least 10% of the maximum head width, preferably over at least 15% of the maximum head width. Particularly favourable results have been achieved in respect of reducing the crosswind sensitivity with low sound emission and low flow resistance in the direction of travel, if the first edge region extends over 10% to 20% of the maximum head width.

In addition or as an alternative, it is provided for the first edge region to begin at a first relative transverse spacing from the vehicle longitudinal centre plane in the vehicle transverse direction, which is at least 15% of the maximum head width. Preferably, the first relative transverse spacing is at least 20% of the maximum head width, and more preferably at least 25% of the maximum head width. Here it is generally the case that the first relative transverse spacing is reduced for different vehicles as the nominal operating speed of the rail vehicle increases (and consequently the first relative transverse spacing is smaller in a vehicle having a higher nominal operating speed than it is in a vehicle having a lower nominal operating speed).

In addition or as an alternative, it is provided for the first edge region to end at a second relative transverse spacing from the vehicle longitudinal centre plane in the vehicle transverse direction, which is at most 30% of the maximum head width. Preferably, the second relative transverse spacing is at most 35% of the maximum head width, and more preferably at most 45% of the maximum head width. Here too, it is generally the case that the second relative transverse spacing is reduced for different vehicles as the nominal operating speed of the rail vehicle increases (and consequently the second relative transverse spacing is smaller in a vehicle having a higher nominal operating speed than it is in a vehicle having a lower nominal operating speed).

The ridge section itself may be configured to have any suitable shape provided it is ensured that a sufficiently abrupt or rapid change in direction of the outer skin is created to ensure an enduring separation of the flow in this region when there is a corresponding crosswind. Preferably, it is provided for the ridge section to be configured to have a substantially sharp edge in a vehicle transverse plane that runs perpendicular to the vehicle longitudinal direction, that is to say the ridge section defines a pronounced edge which favours this enduring separation of the flow when there is a corresponding crosswind.

In addition or as an alternative, it is preferably provided for the ridge section to be configured to be at least section wise rounded in a vehicle transverse plane that runs perpendicular to the vehicle longitudinal direction, wherein the radius of curvature of the ridge section is preferably at most 30 mm, preferably at most 15 mm. Preferably, the radius of curvature of the ridge section is at most 5 mm, and more preferably at most 2 mm, since in this way it is possible to achieve separation edges which are particularly favourable from the point of view of fluid mechanics and yet can be made in a sufficiently simple manner.

In this connection, it should be noted that the radius of curvature is preferably reduced as the roof angle increases, in order to achieve reliable, proper flow separation when there is a corresponding crosswind. Consequently, the more obtuse the roof angle, the sharper the edge is preferably made.

In order to achieve the described sharp edge in the ridge section, its dimensions in the vehicle transverse direction are preferably restricted accordingly. Preferably, in a vehicle transverse plane that runs perpendicular to the vehicle longitudinal direction, the ridge section for this purpose has a maximum transverse dimension of at most 30 mm, preferably at most 15 mm. Preferably, the maximum transverse dimension is at most 5 mm, more preferably at most 2 mm.

In order to achieve enduring flow separation in the region of the roof-like protrusion, the roof-like protrusion is preferably arranged and configured such that in the region thereof a strong flow component which points radially away from the outer skin is imposed on the air flow. In other words, it is preferably provided for the roof-like protrusion to be shaped in the manner of a ramp such that the flow is guided radially away from the outer skin. Preferably, for this reason, it is provided, in a vehicle cross-section of the wagon body that runs perpendicular to the vehicle longitudinal direction, for a line of connection between a point on the ridge section and the centroid of the vehicle cross-section to define a radial direction, in which case the first tangential direction and the radial direction form an angle of less than 60°. Preferably, the angle between the radial direction and the first tangential direction is less than 45°, more preferably less than 35°.

In further preferred variants of the vehicle according to the invention, on the vehicle upper side, in the region of the roof-like protrusion, the outer skin of the head section has a groove-shaped section which may for example have the described effect of diverting the flow in the pronouncedly radial direction in a simple manner. The groove-shaped section is preferably arranged in the outer skin of the head section, in a region outside a windscreen of the head section, since it can be created there in a particularly simple manner. Moreover, at this point, which typically lies relatively far outward (in the vehicle transverse direction), the arrangement is particularly effective as regards reducing the cross-wind sensitivity with low sound development and low resistance to travel, since simply giving the head sections this general shape in this region favours kinking or falling away of the sectional contour correspondingly sharply or in the manner of a cliff in relation to the main direction of flow, which is advantageous for enduring separation from the outer skin.

Preferably, in the groove-shaped section the outer skin, in a vehicle transverse plane that runs perpendicular to the vehicle longitudinal direction, between a ridge section of the roof-like protrusion and the vehicle longitudinal centre plane, has an sectional contour that is substantially continuously curved and has a turning point, wherein the turning point is in particular arranged closer to the ridge section than to the vehicle longitudinal centre plane. As a result of the wave-like sectional contour which this creates, an outer skin of the vehicle may be created in a simple manner, that is overall "smooth", and, apart from the ridge section, eventually free of edges.

In further preferred variants on the invention, having a favourable, pronouncedly radial flow diversion, the sectional contour has a substantially V-shaped kink, wherein the bend is in particular arranged closer to the ridge section than to the vehicle longitudinal centre plane. In this case too, the desired effect may be created using an outer skin which is of relatively simple shape.

The position and extension of the groove-shaped section are similar to the position and extension of the above-described first edge region, since the same effects and advantages are achieved thereby.

With these variants too, the head section, in the vehicle longitudinal direction, has a maximum head length between the free vehicle end and an interface to the body section, wherein the groove-shaped section therefore then extends in the vehicle longitudinal direction over at least 30% of the maximum head length, preferably at least 60% of the maximum head length, more preferably over 30% to 80% of the maximum head length.

In addition or as an alternative, the groove-shaped section begins at a third relative longitudinal spacing from the free vehicle end in the vehicle longitudinal direction, which is at least 2% of the maximum head length, preferably at least 5% of the maximum head length, more preferably at least 15% of the maximum head length. Here too, the third relative longitudinal spacing generally increases for different vehicles as the nominal operating speed of the rail vehicle increases.

In addition or as an alternative, the groove-shaped section ends at a fourth relative longitudinal spacing from the free vehicle end in the vehicle longitudinal direction, which is at most 90% of the maximum head length, preferably at most 80% of the maximum head length, more preferably at most 50% of the maximum head length, wherein the fourth relative longitudinal spacing once again preferably increases for different vehicles as the nominal operating speed of the rail vehicle increases.

In further variants on the invention, the head section has a maximum head height in the vehicle height direction between a vehicle lower edge and a vehicle upper edge, wherein in the vehicle height direction the groove-shaped section preferably extends over at least 35% of the maximum head height, preferably over at least 45% of the maximum head height, more preferably over 40% to 60% of the maximum head height.

In addition or as an alternative, the groove-shaped section begins at a third relative vertical spacing from the vehicle lower edge in the vehicle height direction, which is at least 20% of the maximum head height, preferably at least 25% of the maximum head height, more preferably at least 30% of the maximum head height, wherein the third relative vertical spacing in particular also increases for different vehicles as the nominal operating speed of the rail vehicle increases.

In addition or as an alternative, the groove-shaped section ends at a fourth relative vertical spacing from the vehicle lower edge in the vehicle height direction, which is at most 95% of the maximum head height, preferably at most 85% of the maximum vertical height, more preferably at most 70% of the maximum vertical height, wherein the fourth relative vertical spacing in particular increases for different vehicles as the nominal operating speed of the rail vehicle increases.

Finally, in further variants of the invention, the head section has a maximum head width in the vehicle transverse direction, and the ridge section that delimits the groove-shaped section, in the vehicle transverse direction, extends over at least 10% of the maximum head width, preferably over at least 15% of the maximum head width, more preferably over 10% to 20% of the maximum head width.

In addition or as an alternative, the ridge section that delimits the groove-shaped section begins at a third relative transverse spacing, which is at least 15% of the maximum head width, preferably at least 20% of the maximum head width, more preferably at least 25% of the maximum head width, from the vehicle longitudinal centre plane as seen in the vehicle transverse direction, wherein the third relative transverse spacing is also in particular reduced for different vehicles as the nominal operating speed of the rail vehicle increases.

In addition or as an alternative, the ridge section that delimits the groove-shaped section ends at a fourth relative transverse spacing from the vehicle longitudinal centre plane in the vehicle transverse direction, which is at most 35% of the maximum head width, preferably at most 40% of the maximum head width, more preferably at most 45% of the maximum head width, wherein the fourth relative transverse spacing, in particular, is reduced for different vehicles as the nominal operating speed of the rail vehicle increases.

In principle, one centrally arranged roof-like protrusion may be sufficient to create the desired flow separation and, hence, reduction in the crosswind sensitivity. Since the geometric conditions are more favourable for enduring flow separation at sections which lie further outward in the vehicle transverse direction, a respective roof-like protrusion is preferably provided on both sides of the vehicle.

Accordingly, in preferred variants on the invention the roof-like protrusion is a first roof-like protrusion, while a second roof-like protrusion is provided on the outer skin on the other side of the vehicle longitudinal centre plane. The second roof-like protrusion is in this case typically configured to be substantially symmetric to the first roof-like protrusion in relation to the vehicle longitudinal centre plane. However, a deviation from this symmetry may also be provided if this is able to provide advantages for other considerations.

The first roof-like protrusion and the second roof-like protrusion may in principle be arranged in any suitable manner in relation to one another. For example, they may run parallel to one another. In preferred variants on the invention, the first roof-like protrusion and the second roof-like protrusion, in a front view in the direction of the vehicle longitudinal axis, run substantially in a V shape in relation to one another (and do not necessarily have to meet). The first roof-like protrusion and the second roof-like protrusion, in the front view, may in this case at least section wise define a convex V shape (each having an outward bulge which points outwards away from the longitudinal centre plane). In addition or as an alternative, the first roof-like protrusion and the second roof-like protrusion, in the front view, may at least section wise define a concave V shape (each having an inward bulge which points inwards towards the longitudinal centre plane), at least in certain sections.

The course of the roof-like protrusion in this case is preferably formed according to the general geometry of the head section in order to optimise it in a manner adapted thereto in respect of reduced crosswind sensitivity with low sound development and low resistance to travel. Here, the course of the roof-like protrusion is approximated to the course of the streamlines when flow is purely axial, in order to achieve minimal sound development and minimal resistance to travel. Preferably, the roof-like protrusion is thus arranged such that its course is at least approximated to a guide streamline, and in particular substantially follows a guide streamline. Here, the guide streamline results when there is flow purely in the vehicle longitudinal direction against a reference vehicle having a smoothed and in particular continuously curved reference outer skin without the roof-like protrusion but otherwise of identical shape.

The present invention can in principle be used for any desired vehicle. Preferably, this is a vehicle for high-speed traffic, having a nominal operating speed above 250 km/h, in particular above 300 km/h, since its advantages are seen in particular in these speed ranges. Similarly, the invention can be used particularly effectively with double-decker vehicles, which are particularly sensitive to crosswind because of their height. Their advantages are also seen in particular in vehicles that are comparatively lightweight and thus particularly sensitive to crosswind, such as trams, narrow-gauge vehicles or the end cars of trains, in particular control cars for trains.

BRIEF DESCRIPTION OF THE DRAWINGS

Further embodiments of the present invention will become apparent from the dependent claims and the following description of preferred embodiments which refers to the appended figures. It is shown in:

FIG. 17 a schematic front view of the detail XVII from FIG. 16;

FIG. 18A to 18D show a respective schematic front view of part of the vehicle tip of the vehicle from FIG. 13, which have been cut away in different sectional planes that run perpendicular to the vehicle longitudinal direction.

DETAILED DESCRIPTION OF THE INVENTION

Figure 1:
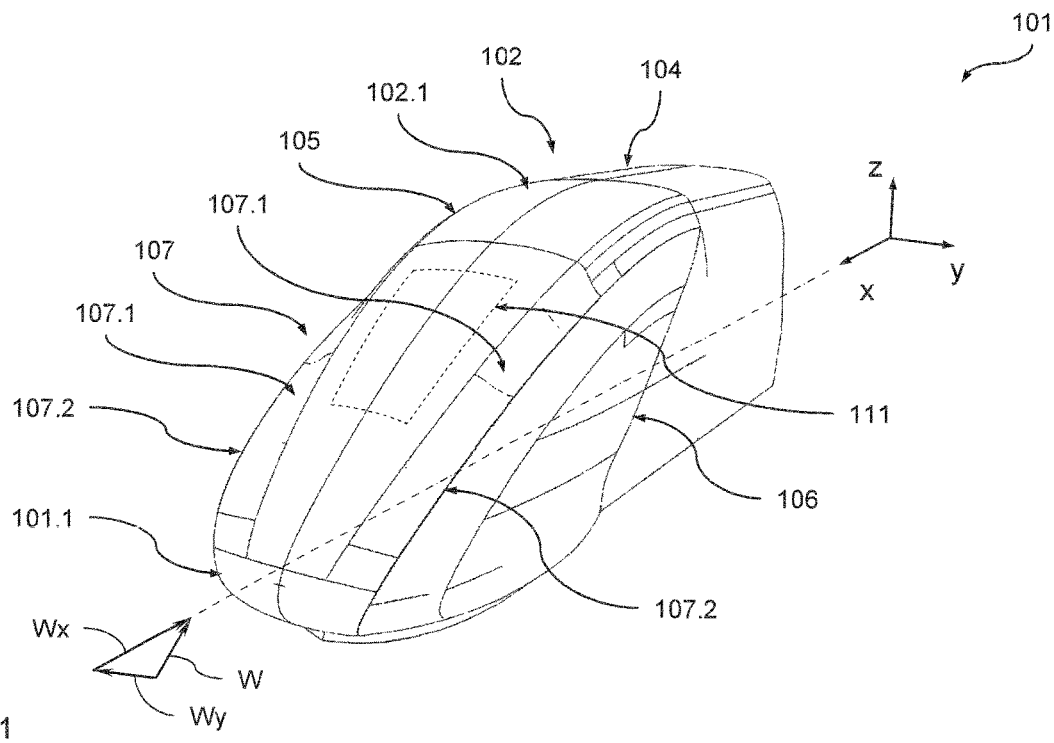
FIG. 1 a schematic perspective view of part of a preferred embodiment of the vehicle according to the invention.

Below, a first preferred embodiment of the vehicle according to the invention, in the form of a rail vehicle 101, will be described with reference to FIGS. 1 to 6. The rail vehicle 101 is an end car of a train for intercity traffic, the nominal operating speed whereof is above 200 km/h, namely $v_n$=250 km/h.

The vehicle 101 comprises a wagon body 102 which defines an outer skin 102.1 of the vehicle 101. The wagon body 102 is supported in the region of each of its two ends, in conventional manner, on a respective running gear in the form of a bogie 103. However, it will be appreciated that the present invention may also be used in conjunction with other configurations in which the wagon body is supported only on one running gear.

For ease of comprehension of the explanations below, the figures indicate a vehicle coordinate system x, y, z (predetermined by the plane on which the wheels of the bogie 103 stand), in which the x coordinate designates the longitudinal direction of the rail vehicle 101, the y coordinate designates the transverse direction of the rail vehicle 101 and the z coordinate designates the height direction of the rail vehicle 101.

The wagon body 102 has a body section 104 and, adjacent the latter, a head section 105. The body section 104 has (apart from local recesses for functional components of the vehicle such as current collectors, roof-mounted containers, etc.) a substantially prismatic shape (with substantially identical sectional contours of the outer skin 102.1 along the vehicle longitudinal direction). By contrast, the head section 105 tapers both in the vehicle height direction and in the vehicle transverse direction towards the end of the vehicle 101, with the result that when the vehicle 101 is in operation it can form a free vehicle end of the vehicle 101.

Provided in the head section 105 is a compartment for the vehicle driver, from which the vehicle driver controls the vehicle 101. In the present example, the vehicle 101 is configured as a comparatively lightweight control car with no heavy, central components of the traction equipment (such as a main transformer, etc.). However, it will be appreciated that in other variants on the invention the vehicle may for example also be configured as a motor car having correspondingly heavy, central components of the traction equipment.

The interface region 106 between the head section 105 and the body section 104 is defined by the respective transition point on the outer skin 102.1 at which the outer skin 102.1 merges into a prismatic region, where the spacing between the outer skin 102.1 and the longitudinal centre plane (xz plane) no longer varies along the vehicle longitudinal direction.

This transition point may be at different positions over the vehicle height in the vehicle longitudinal direction. As can be seen for example from FIGS. 1 and 2, the interface region 106 runs, in its lower region 106.1 and in its upper region 106.2, substantially in the vehicle height direction (z direction), whereas over the central region 106.3 lying in between it runs obliquely inclined towards the rear. However, it will be appreciated that, in other variants of the invention, the interface region may also lie in a single plane that runs perpendicular to the vehicle longitudinal direction.

Figure 2:
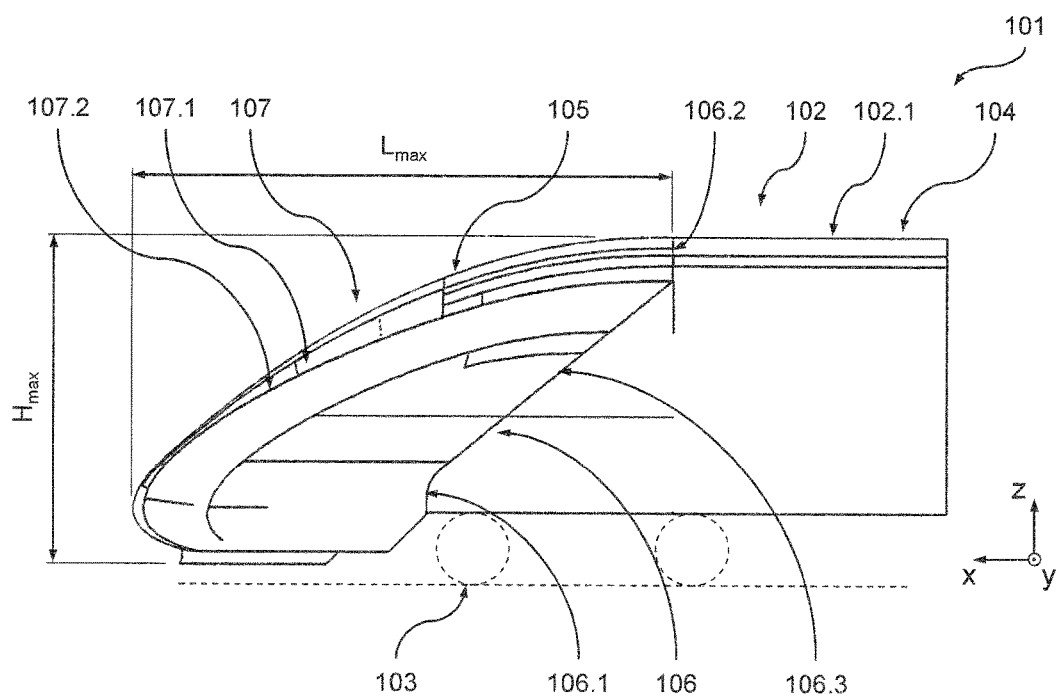
FIG. 2 a schematic side view of the vehicle from FIG. 1.

As can be seen from FIG. 2, the head section 105 has a maximum head length $L_{max}$ which is defined by the maximum spacing, measured in the vehicle longitudinal direction (x direction), between the vehicle tip 101.1 and the interface region 106 (see FIG. 2). A maximum head height $H_{max}$ of the head section 105 is defined by the maximum spacing, measured in the vehicle height direction (z direction), between the vehicle underside of the head section 105 and the roof of the head section 105 (see FIGS. 2 and 3). Finally, a maximum head width $B_{max}$ of the head section 105 is defined by the maximum spacing, measured in the vehicle transverse direction (y direction), between the two vehicle sides of the head section 105 (see FIG. 3).

As already discussed at the outset, in the case of a vehicle of this kind, with a comparatively high nominal operating speed and comparatively low weight, there is a fundamental problem that it has an increased so-called crosswind sensitivity.

Thus, as illustrated in simplified manner in FIG. 1 by the vectors Wx, Wy and W, a crosswind Wy in combination with the flow Wx prevailing parallel to the vehicle longitudinal direction (and resulting from speed of travel v of the vehicle 101 and any wind component above ground in this direction) will produce an overall oblique flow W against the wagon body 102, for which the following vector equation applies:

$$\vec{W}=\vec{W}x+\vec{W}y. \quad (1)$$

An increase in the flow speed W or an increase in the deviation from flow parallel to the direction of travel may, with conventional vehicles, produce an unfavourable pressure distribution at the leading vehicle head, which among other things results in an upward force and in some cases a rolling moment in the region of the vehicle head and which, in some cases, may result in considerable wheel unloading at the running gear in the region of the vehicle head.

In order to increase the crosswind stability of the vehicle 101 (or to reduce crosswind sensitivity), the head section 105 is provided with a flow separation unit 107 which, in the event of oblique flow W, at least reduces the unfavourable character (for example unevenness prevailing in the vehicle transverse direction) of the pressure distribution in the region of the head section 105, by a leeside separation of the flow from the outer skin 102.1 at an early stage and in an enduring manner, and hence avoids the excessive wheel unloading at the running gear 103 which would otherwise result.

For this purpose, the flow separation unit 107, on both sides of the wagon body 102, comprises a respective groove-shaped section 107.1 which is integrated in the outer skin 102.1 and on the outer side (in the vehicle transverse direction) of which a respective, substantially rigid roof-like protrusion 107.2 is defined. The roof-like protrusion 107.2 projects outwards in comparison to the geometry of conventional vehicles having a rounded outer skin as indicated by the dashed contour 108 in FIG. 4. This roof-like protrusion 107.2 is arranged spaced from the vehicle longitudinal centre plane (xz plane) on the lee side when there is an oblique flow against the vehicle, and by means of its ridge section there forms a flow separation edge for the air flow.

The roof-like protrusion 107.2 is of such a pronounced shape that, at all the travel speeds v that may be achieved in normal operation of the vehicle 101 at which a critical wheel unloading could occur as a result of crosswind (for example in the sense of TSI RS, mentioned at the outset), a reliable and enduring separation of the flow from the outer skin 102.1 is ensured, and consequently the possibility that the flow will re-attach to the outer skin 102.1 downstream (in the direction of flow) of the protrusion 107.2 is reliably prevented. This means that it is possible, for example, despite the comparatively low weight of the vehicle 101, to observe the criteria of crosswind stability as defined for example in TSI RS, mentioned at the outset, without having to fall back to conventional aids such as additional ballast or similar, or a reduction in the travel speed at an early stage which is forced by crosswind.

Figure 4:
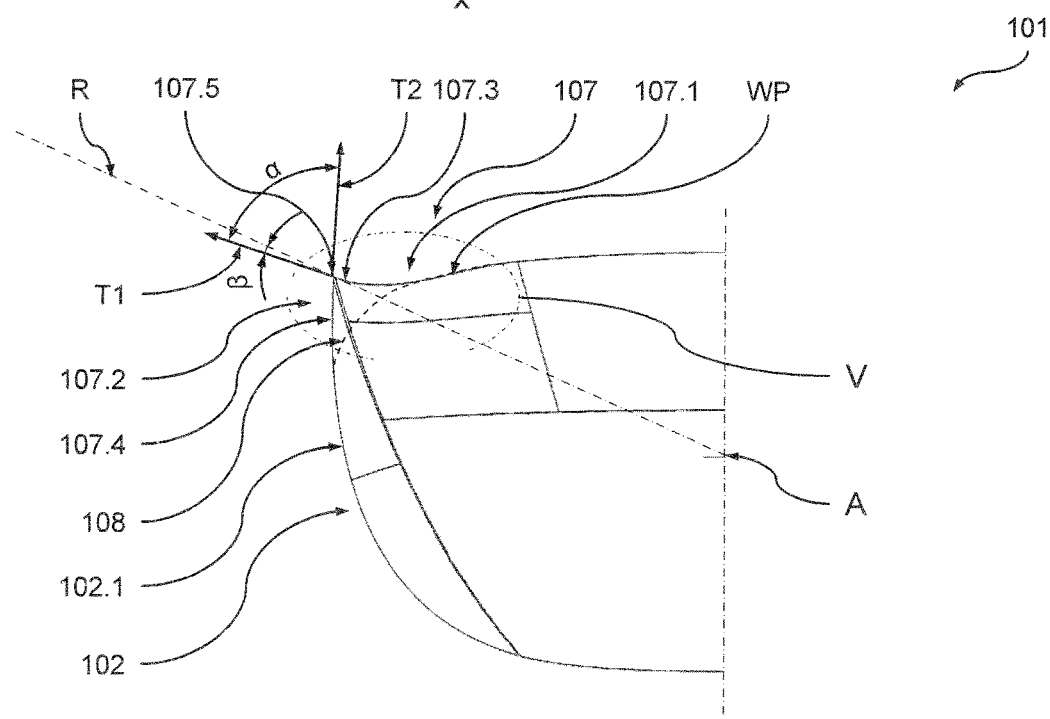
FIG. 4 a schematic front view of part of the vehicle tip of the vehicle from FIG. 1, which has been cut away in a sectional plane that runs perpendicular to the vehicle longitudinal direction.
Figure 5:
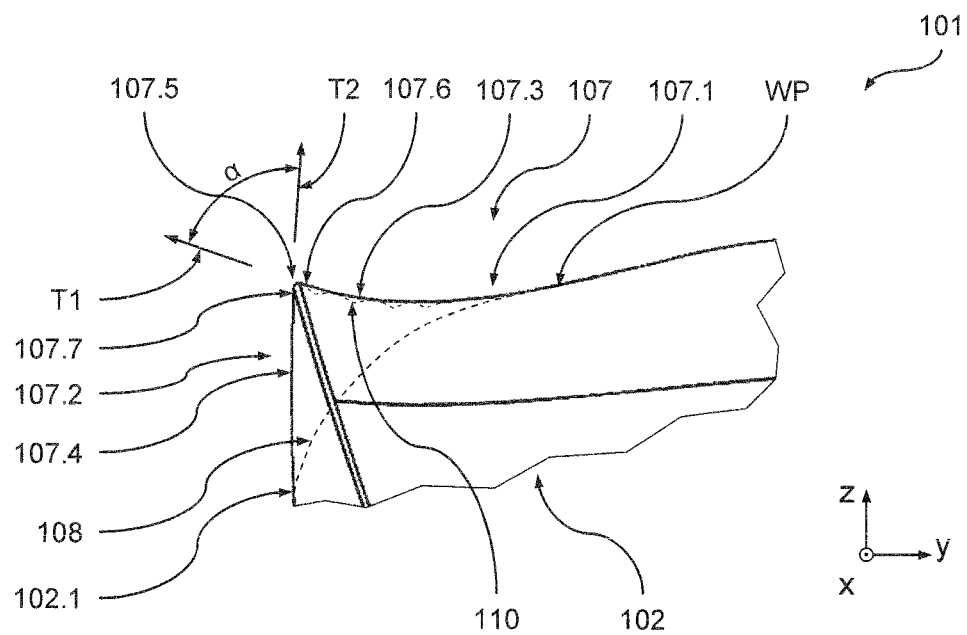
FIG. 5 a schematic front view of the detail V from FIG. 4.

As can be seen, in particular, from FIGS. 4 and 5, the roof-like protrusion 107.2 for this purpose has a first roof section 107.3 facing towards the vehicle longitudinal centre plane (xz plane), a second roof section 107.4 facing away from the vehicle longitudinal centre plane and a ridge section 107.5 which forms a transition between the first roof section 107.3 and the second roof section 107.4.

The first roof section 107.3 and the second roof section 107.4 run at an incline to one another such that the ridge section 107.5, among other things upon a nominal operating speed $v_n$ of the rail vehicle and an oblique flow W against the wagon body 102 and, hence, also an oblique flow against the roof-like protrusion 107.2 by an air flow from the vehicle longitudinal centre plane, forms a flow separation edge for the air flow.

In order to ensure reliable and enduring separation of the air flow upon oblique flow against the wagon body 102, on the one hand, the first roof section 107.3 and the second roof section 107.4 are arranged in relation to one another such that, upon oblique flow against the vehicle 101, in the region of the air flow close to the boundary layer, a main direction of flow is imposed on the air flow by the first roof section 107.3. On the other hand, the sectional contour of the outer skin 102.1 (in a sectional plane containing the main direction of flow) in the region of the second roof section 107.4 (in the main direction of flow downstream of the ridge section 107.5) kinks away sharply or in the manner of a cliff in relation to the main direction of flow such that the air flow is unable to follow this rapid change in direction of the outer skin 102.1 and is consequently enduringly separated from the outer skin 102.1.

In the present example, the first roof section 107.3 is configured such that, in a vehicle transverse plane that runs perpendicular to the vehicle longitudinal direction, upon flow in the vehicle transverse direction (y direction) from the vehicle longitudinal centre plane (xz plane), it imposes a first tangential direction T1 on the air flow in a first adjacent region 107.6 adjacent the ridge section 107.5. Furthermore, the second roof section 107.4 is configured such that, in the vehicle transverse plane, upon flow in the vehicle transverse direction (y direction) towards the vehicle longitudinal centre plane (xz plane), it imposes a second tangential direction T2 on an air flow in a second adjacent region 107.7 adjacent the ridge section 107.5 (see FIGS. 4 and 5).

Here, the first tangential direction T1 and the second tangential direction T2 define a roof angle α (between the two roof sections 107.3, 107.4) of the roof-like protrusion 107.2.

Figure 6:
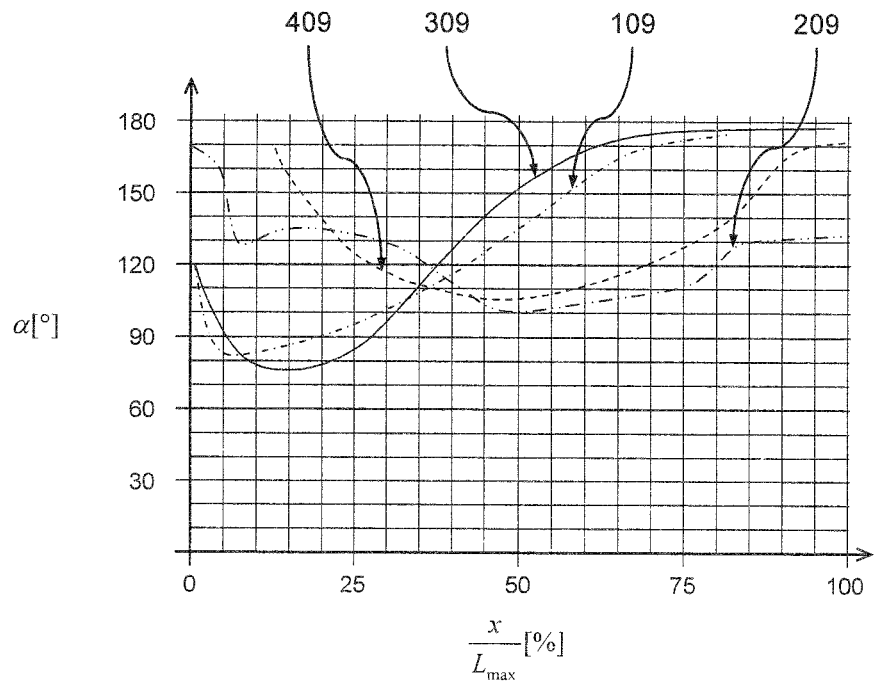
FIG. 6 the course of the roof angle by way of graphs reproducing the head length, for different vehicles.

In order to achieve the described rapid change in direction in the outer skin 102.1 and, hence, the desired enduring flow separation, the roof angle α, over a first edge region of the roof-like protrusion 107.2 extending in the vehicle longitudinal direction, is less than 120°, as can be seen in particular from the curve 109 in FIG. 6. Here, the curve 109 in FIG. 6 represents the course of the roof angle α (in degrees) for the vehicle 101 over the x coordinate related to the maximum head length $L_{max}$ of the head section 105 (in percent), starting from the vehicle tip (0%). The same can also be seen from the sectional contours of the outer skin 102.1 (in sectional planes perpendicular to the vehicle longitudinal direction), which are shown in the manner of level contour lines in FIG. 3.

As can be seen, in particular, from the curve 109, the first edge region extends from approximately 1% to 42% (that is to say over approximately 41%) of the maximum head length $L_{max}$. In a second edge region which extends from approximately 1.5% to 41% (that is to say over approximately 39.5%) of the maximum head length $L_{max}$, the roof angle α is less than 110°. In a third edge region which extends from approximately 2% to 29% (that is to say over approximately 27%) of the maximum head length $L_{max}$, the roof angle α is less than 100°. In a fourth edge region which extends from approximately 3% to 20% (that is to say over approximately 17%) of the maximum head length $L_{max}$, the roof angle α is less than 90°. The minimum roof angle $α_{min}=82°$ is achieved in the section illustrated in FIG. 4 (which corresponds to the sectional contour IV from FIG. 3), which lies at approximately 8% of the maximum head length $L_{max}$.

As regards the position of the roof-like protrusion 107.2 in the vehicle height direction (z direction), it should be noted that the ridge section 107.5 of the first edge region extends from the vehicle lower edge (0%) from approximately 25% to 61% (that is to say over approximately 36%) of the maximum head height $H_{max}$, wherein the ridge section 107.5 rises towards the body section 104. In the second edge region, the ridge section 107.5 extends from approximately 25.5% to 56% (that is to say over approximately 30.5%) of the maximum head height $H_{max}$. In the third edge region, the ridge section 107.5 extends from approximately 26% to 51% (that is to say over approximately 25%) of the maximum head height $H_{max}$. In the fourth edge region, the ridge section 107.5 extends from approximately 31% to 43% (that is to say over approximately 12%) of the maximum head height $H_{max}$. The point on the ridge section 107.5 having the minimum roof angle ($α_{min}=82°$; see FIG. 4) lies at approximately 33.5% of the maximum head height $H_{max}$.

As regards the position of the roof-like protrusion 107.2 in the vehicle transverse direction (y direction), it should be noted that the ridge section 107.5 of the first edge region, seen from the longitudinal centre plane (0%), extends from approximately 32% to 39% (that is to say over approximately 7%) of the maximum head width $B_{max}$, wherein the ridge section 107.5 moves away from the longitudinal centre plane towards the body section 104. In the second edge region, the ridge section 107.5 extends from approximately 32.2% to 38% (that is to say over approximately 5.8%) of the maximum head width $B_{max}$. In the third edge region, the ridge section 107.5 extends from approximately 32.5% to 37.2% (that is to say over approximately 4.7%) of the maximum head width $B_{max}$. In the fourth edge region, the ridge section 107.5 extends from approximately 33% to 35.9% (that is to say over approximately 2.9%) of the maximum head width $B_{max}$. The point on the ridge section 107.5 having the minimum roof angle ($α_{min}=82°$; see FIG. 4) lies at approximately 34.5% of the maximum head width $B_{max}$.

In the present example, the outer skin 102.1, in the region of the roof sections 107.3 and 107.4, forms a substantially smooth surface (with an at most moderate change in curvature in the vehicle transverse direction). The sectional contour of the outer skin 102.1, in a sectional plane that runs perpendicular to the vehicle longitudinal direction, has a turning point WP which is arranged closer to the ridge section 107.5 than to the vehicle longitudinal centre plane. As a result of this, a wave-like sectional contour is produced, which is advantageous to a flow free of disruptions and by means of which an outer skin of the vehicle that is smooth overall, being free of edges apart from the ridge section, may be created in a simple manner.

In particular, as a result of this, the first tangential direction T1 and the second tangential direction T2 correspond to the tangent at the first adjacent region 107.6 and the second adjacent region 107.7, respectively. However, it will be appreciated that, in other variants of the invention, the outer skin of the wagon body need not necessarily be a smooth contour or surface of this kind in the respective adjacent region. Rather, local deviations (such as local ribs, edges, dents, etc., as indicated in FIG. 5 by the dashed contour 110) are possible here, provided the respective tangential direction T1 or T2 is imposed on the respective flow as the main direction of flow in the region close to the boundary layer.

The ridge section 107.5 is shaped such that, in the region thereof, a sufficiently abrupt or rapid change in direction of the outer skin is created to ensure an enduring flow separation. For this purpose, the ridge section 107.5 is configured to have a substantially sharp edge in a vehicle transverse plane that runs perpendicular to the vehicle longitudinal direction. For this purpose, the ridge section 107.5 may indeed be rounded but the radius of curvature of the ridge section 107.5 is only 5 mm (or where appropriate may even be only 2 mm), while its maximum transverse dimension is less than 5 mm (or where appropriate may even be less than 3 mm), with the result that it defines a pronounced edge which favours this enduring flow separation but is still sufficiently simple to produce.

Figure 3:
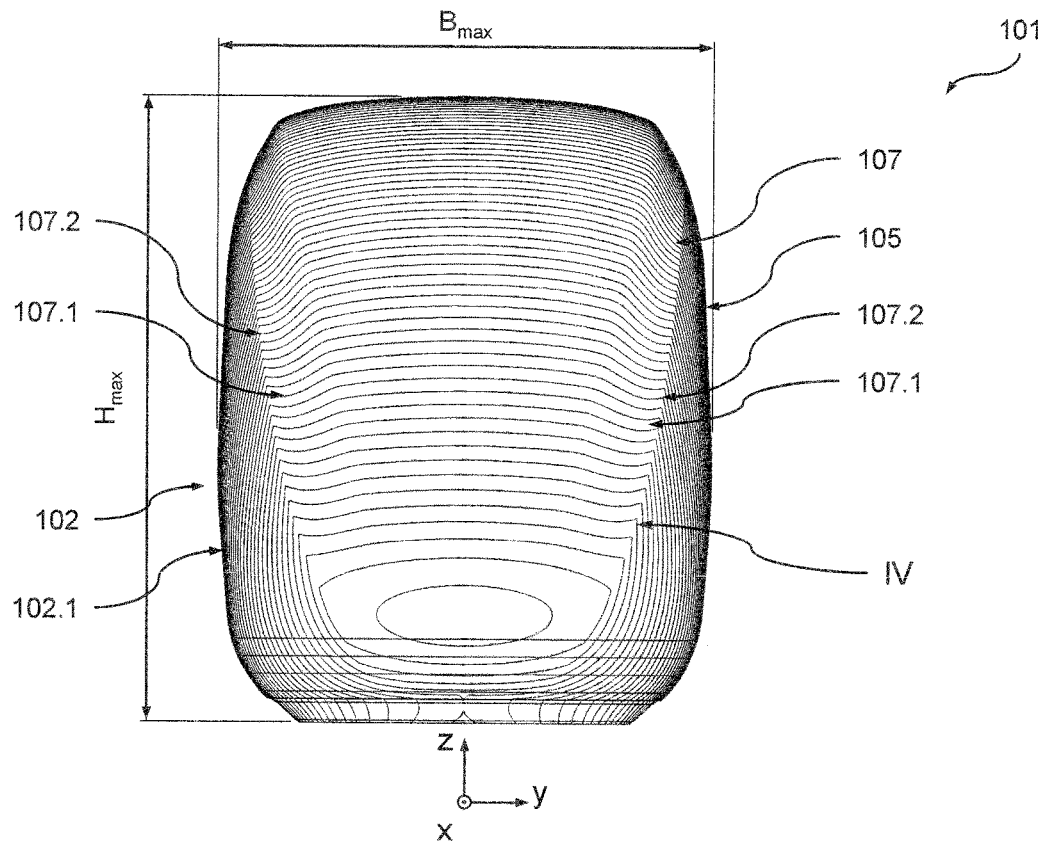
FIG. 3 a schematic front view of the vehicle from FIG. 1.

As can further be seen from FIGS. 3 and 4, in the present example, the roof-like protrusion 107.2 is shaped and arranged in the manner of a ramp such that a strong flow component directed radially away from the outer skin 102.1 is imposed on the air flow in the region thereof. As can be seen from FIG. 4, in the sense of the present invention, in a vehicle cross-section that runs perpendicular to the vehicle longitudinal direction, the radial direction is defined by a line of connection R between a point on the ridge section 107.5 and the centroid A of the vehicle cross-section. In the present example, an angle β of less than 45° is formed between the first tangential direction T1 and the radial direction R over the first edge region. In the section illustrated in FIG. 4, the angle β is as little as approximately 5°.

As can further be seen from FIGS. 1 and 3, the groove-shaped section 107.1 is arranged with the roof-like protrusion 107.2 in a region which lies relatively far outward (as seen in the vehicle transverse direction), outside a windscreen 111 of the head section 105, since it can be created there in a particularly simple manner. Moreover, this relatively far outward position is advantageous as regards the simple creation of the roof-like protrusion 107.2, since simply giving the head section 105 this general shape in this relatively far outward position favours a correspondingly sharp or cliff-like kinking away of the outer skin 102.1 in relation to the main direction of flow.

The course of the roof-like protrusions 107.1 is based on the general geometry of the head section 105 in order to optimise it in a manner adapted thereto in respect of reduced crosswind sensitivity with low sound development and low resistance to travel.

As can further be seen from FIGS. 1 and 3 in this context, the ridge sections 107.5 of the two roof-like protrusions 107.1 run substantially in a V shape in relation to one another, as seen in a front view in the direction of the vehicle longitudinal axis, wherein they define a convex V shape. This advantageously has the effect of approximating the course of the ridge sections 107.5 or the roof-like protrusions 107.1 to the course of the streamlines when flow is purely axial. This is highly advantageous in that when flow against the wagon body 102 is purely axial, the roof-like protrusions 107.1 do not cause any flow disturbance, in particular as a result of their ridge sections 107.5, with the result that, in the event of purely axial flow or flow that deviates only slightly therefrom, minimal sound development and minimal resistance to travel are produced.

In the present example, the course of the ridge sections 107.5 or the roof-like protrusions 107.1 to this end follows the course of a guide streamline. Here, the guide streamline is a substantially undisturbed streamline which results from flow against the wagon body 102 purely in the vehicle longitudinal direction. In other variants on the invention, it is also possible here to make an adjustment to a conventional reference vehicle having a smoothed, continuously curved reference outer skin without the roof-like protrusion but otherwise of identical shape. The guide streamline is then produced from flow against the reference vehicle purely in the vehicle longitudinal direction.

Another advantageous embodiment of the vehicle 201 according to the invention is described below with reference to FIGS. 6 to 12D. Here, the basic design and functionality of the vehicle 201 correspond to the vehicle 101 from FIGS. 1 to 5, so only the differences will be discussed here. In particular, like components are provided with reference numerals incremented by a value of 100. Unless stated otherwise below, the reference is made to the statements given above in connection with the first embodiment as regards the features, functions and advantages of these components.

The difference from the vehicle 101 consists in the fact that the vehicle 201 is a control car for a train the nominal operating speed of which is above 300 km/h, namely $v_n$=360 km/h.

In order to increase the crosswind stability of the vehicle 201, once again the head section 205 of the wagon body 202 is provided with a flow separation unit 207 which, in the event of oblique flow W, at least reduces the unfavourable character (for example unevenness prevailing in the vehicle transverse direction) of the pressure distribution in the region of the head section 205, by a leeside separation of the flow from the outer skin 202.1 at an early stage and in an enduring manner, and hence avoids the excessive wheel unloading at the running gear 203 which would otherwise result.

For this purpose, once again the flow separation unit 207 comprises on both sides of the wagon body 202 a respective groove-shaped section 207.1 which is integrated in the outer skin 202.1 and on the outer side (in the vehicle transverse direction) of which a respective, substantially rigid roof-like protrusion 207.2 is defined. The roof-like protrusion 207.2 projects outwards in comparison to the geometry of conventional vehicles having a rounded outer skin as indicated by the dashed contour 208 in FIG. 10. This roof-like protrusion 207.2 is arranged spaced from the vehicle longitudinal centre plane (xz plane) on the lee side when there is an oblique flow against the vehicle, and by means of its ridge section 207.5 there forms a flow separation edge for the air flow.

The roof-like protrusion 207.2 is of such a pronounced shape that, at all the travel speeds v that may be achieved in normal operation of the vehicle 201 at which a critical wheel unloading could occur as a result of crosswind (for example in the sense of TSI RS, mentioned at the outset), a reliable and enduring separation of the flow from the outer skin 202.1 is ensured, and consequently the possibility that the flow will re-attach to the outer skin 202.1 downstream (in the direction of flow) of the protrusion 207.2 is reliably prevented. This means that it is possible for example, despite the comparatively low weight of the vehicle 201, to observe the criteria of crosswind stability as defined for example in TSI RS, mentioned at the outset, without having to fall back to conventional aids such as additional ballast or similar, or a reduction in the travel speed at an early stage which is forced by crosswind.

As can be seen in particular from FIGS. 10 and 11, once again the roof-like protrusion 207.2 for this purpose has a first roof section 207.3 facing towards the vehicle longitudinal centre plane (xz plane), a second roof section 207.4 facing away from the vehicle longitudinal centre plane and a sharp-edged ridge section 207.5 (radius of curvature 3 mm, maximum transverse dimension less than 4 mm) which forms a transition between the first roof section 207.3 and the second roof section 207.4. The sectional contour of the first roof section 207.3 and the second roof section 207.4 is at most very slightly curved in the present example, such that a particularly simple geometry of the head section 205 results in this region, which is easy to be manufactured.

In order to ensure reliable and enduring separation of the air flow upon an oblique flow against the wagon body 202, on the one hand, the first roof section 207.3 and the second roof section 207.4 are arranged in relation to one another such that, upon an oblique flow against the vehicle 201, a main direction of flow is imposed on the air flow by the first roof section 207.3 in the region of the air flow close to the boundary layer. On the other hand, the sectional contour of the outer skin 202.1 (in a sectional plane containing the main direction of flow) in the region of the second roof section 207.4 (in the main direction of flow downstream of the ridge section 207.5) kinks away sharply or in the manner of a cliff in relation to the main direction of flow such that the air flow is unable to follow this rapid change in direction of the outer skin 202.1 and is consequently enduringly separated from the outer skin 202.1.

Once again, the first roof section 207.3 and the second roof section 207.4 define a tangential direction T1 and a second tangential direction T2 respectively, which for their part define a roof angle α (between the two roof sections 207.3, 207.4) of the roof-like protrusion 207.2.

In order to achieve the above-described rapid change in direction in the outer skin 202.1 and, hence, the desired enduring flow separation, the roof angle α, over a first edge region of the roof-like protrusion 207.2 extending in the vehicle longitudinal direction, is less than 120°, as can be seen in particular from the curve 209 in FIG. 6. Here, the curve 209 in FIG. 6 represents the course of the roof angle α (in degrees) for the vehicle 201 over the x coordinate related to the maximum head length $L_{max}$ of the head section 205 (in percent), starting from the vehicle tip (0%).

As can be seen, in particular, from the curve 209, the first edge region extends from approximately 35% to 80% (that is to say over approximately 45%) of the maximum head length $L_{max}$. In a second edge region which extends from approximately 42% to 73% (that is to say over approximately 31%) of the maximum head length $L_{max}$, the roof angle α is less than 110°. The minimum roof angle $\alpha_{min}$=100° is achieved in the section illustrated in FIG. 10, which lies at approximately 50% of the maximum head length $L_{max}$.

Figure 12A:
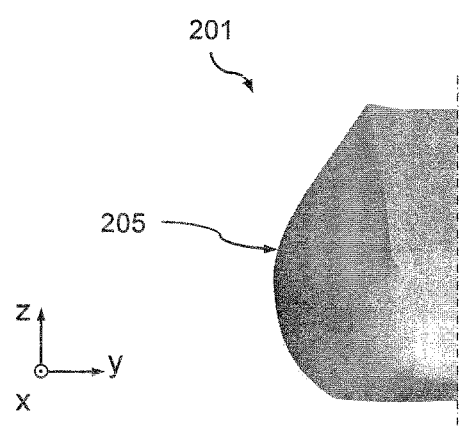
FIG. 12A to 12D a respective schematic front view of part of the vehicle tip of the vehicle from FIG. 7, which have been cut away in different sectional planes that run perpendicular to the vehicle longitudinal direction.
Figure 12B:
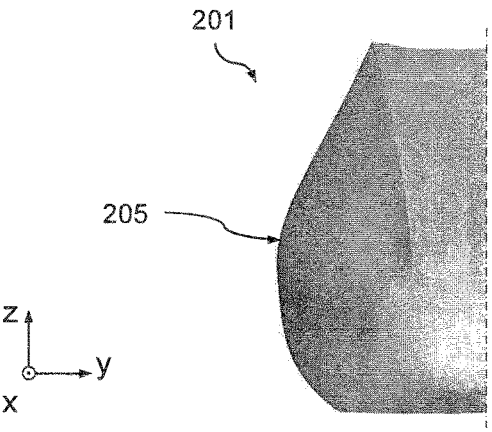
Figure 12C:
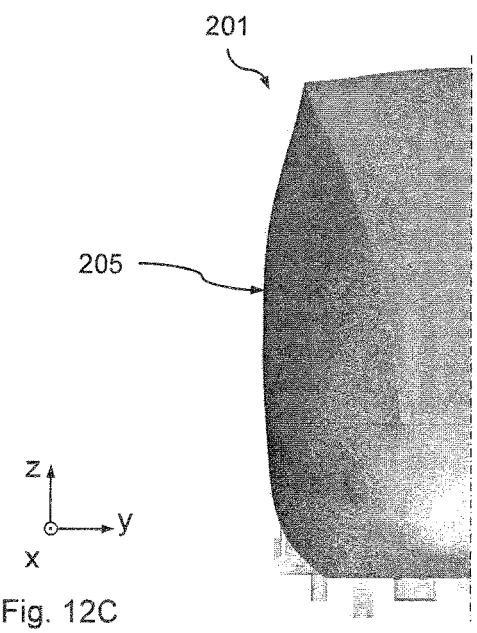
Figure 12D:
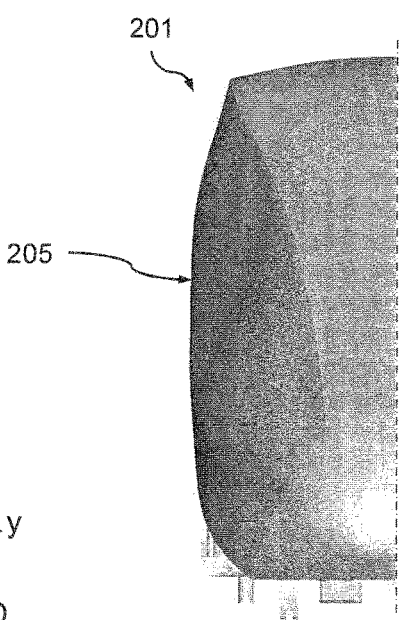

For the purpose of illustrating the sectional contours of the outer skin 202.1, FIGS. 12A to 12D show parts of the vehicle tip 201.1, which have been cut away at both ends of the first edge region and the second edge region, respectively (FIG. 12A at approximately 35% of the maximum head length $L_{max}$, FIG. 12B at approximately 42% of the maximum head length $L_{max}$, FIG. 12C at approximately 73% of the maximum head length $L_{max}$ and FIG. 12D at approximately 80% of the maximum head length $L_{max}$).

As regards the position of the roof-like protrusion 207.2 in the vehicle height direction (z direction), it should be noted that the ridge section 207.5 of the first edge region extends from the vehicle lower edge (0%) from approximately 58% to 92% (that is to say over approximately 34%) of the maximum head height $H_{max}$, wherein the ridge section 207.5 rises towards the body section 204. In the second edge region, the ridge section 207.5 extends from approximately 67% to 91% (that is to say over approximately 24%) of the maximum head height $H_{max}$. The point on the ridge section 207.5 having the minimum roof angle ($\alpha_{min}$=100°; see FIG. 10) lies at approximately 76% of the maximum head height $H_{max}$. As regards the position of the roof-like protrusion 207.2 in the vehicle transverse direction (y direction), it should be noted that the ridge section 207.5 of the first edge region, seen from the longitudinal centre plane (0%), extends from approximately 24% to 40% (that is to say over approximately 16%) of the maximum head width $B_{max}$, wherein the ridge section 207.5 moves away from the longitudinal centre plane towards the body section 204. In the second edge region, the ridge section 207.5 extends from approximately 26% to 39% (that is to say over approximately 13%) of the maximum head width $B_{max}$. The point on the ridge section 207.5 having the minimum roof angle ($\alpha_{min}$=105°; see FIG. 10) lies at approximately 30% of the maximum head width $B_{max}$.

In the present example, the outer skin 202.1, in the region of the roof sections 207.3 and 207.4, forms a substantially smooth surface (with an at most moderate change in curvature in the vehicle transverse direction). The sectional contour of the outer skin 202.1, in a sectional plane that runs perpendicular to the vehicle longitudinal direction, has a kinking point KP which is defined at the base of a V-shaped kink in the sectional contour.

Figure 10:
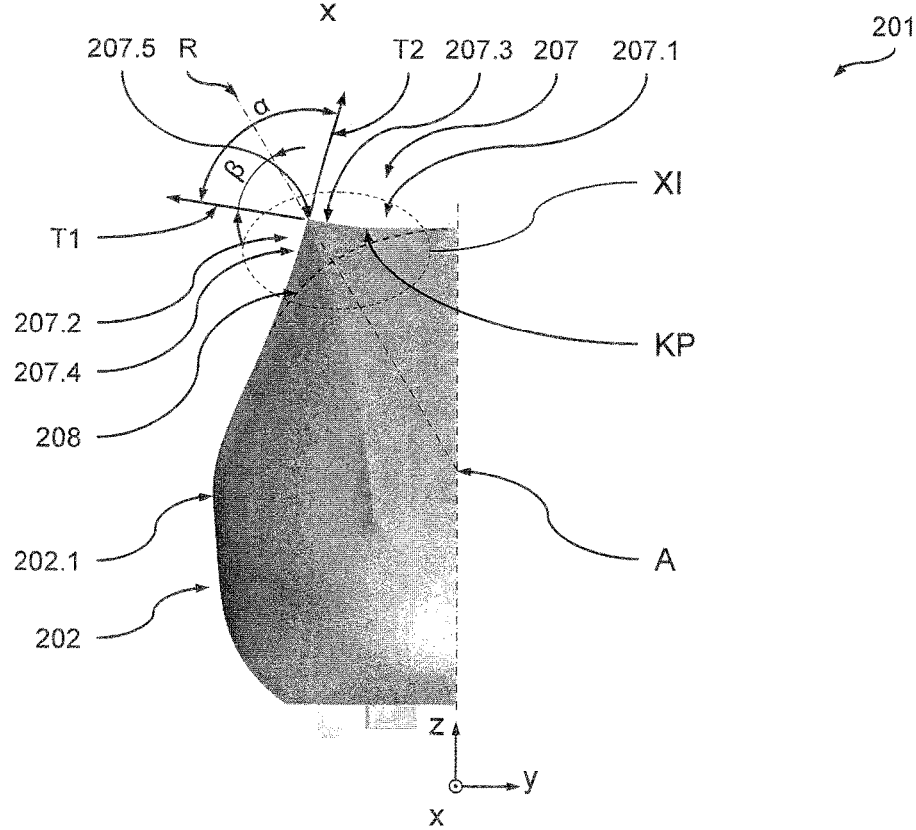
FIG. 10 a schematic front view of part of the vehicle tip of the vehicle from FIG. 7, which has been cut away in a sectional plane that runs perpendicular to the vehicle longitudinal direction.
Figure 11:
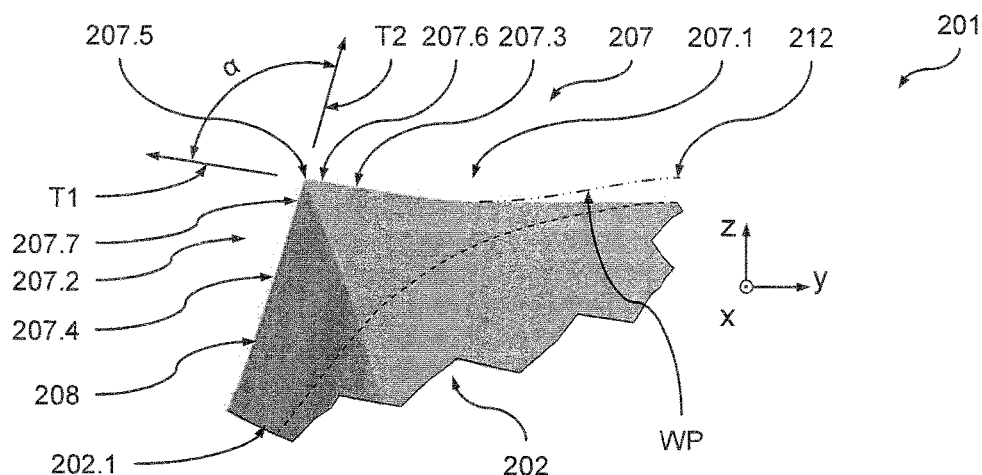
FIG. 11 a schematic front view of the detail XI from FIG. 10.

As can further be seen from FIGS. 10 and 11, in the present example too, the roof-like protrusion 207.2 is shaped and arranged in the manner of a ramp such that a strong flow component directed radially away from the outer skin 202.1 is imposed on the air flow in the region thereof. As can be seen from FIG. 10, in the sense of the present invention, in a vehicle cross-section that runs perpendicular to the vehicle longitudinal direction, the radial direction is once again defined by a line of connection R between a point on the ridge section 207.5 and the centroid A of the vehicle cross-section. In the present example, an angle β of less than 60° is formed between the first tangential direction T1 and the radial direction R over the first edge region. In the section illustrated in FIG. 10, the angle β is approximately 50°.

Figure 7:
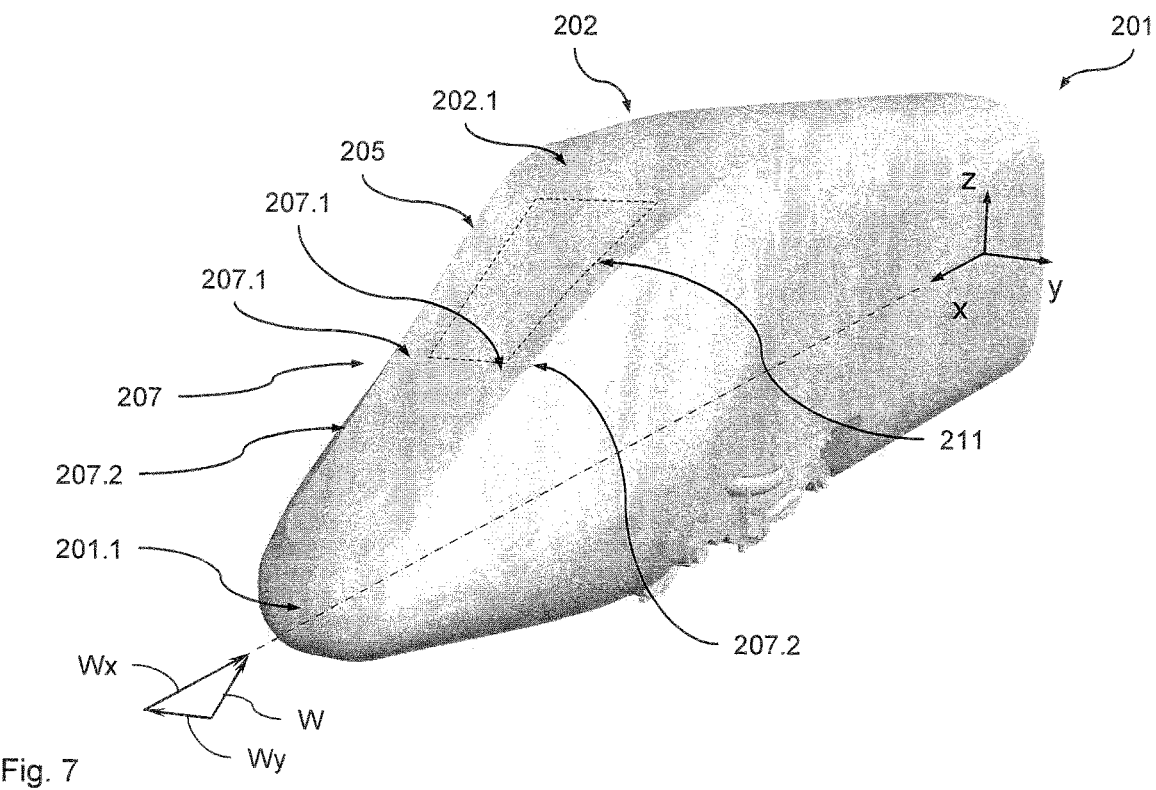
FIG. 7 a schematic perspective view of part of another preferred embodiment of the vehicle according to the invention.
Figure 8:
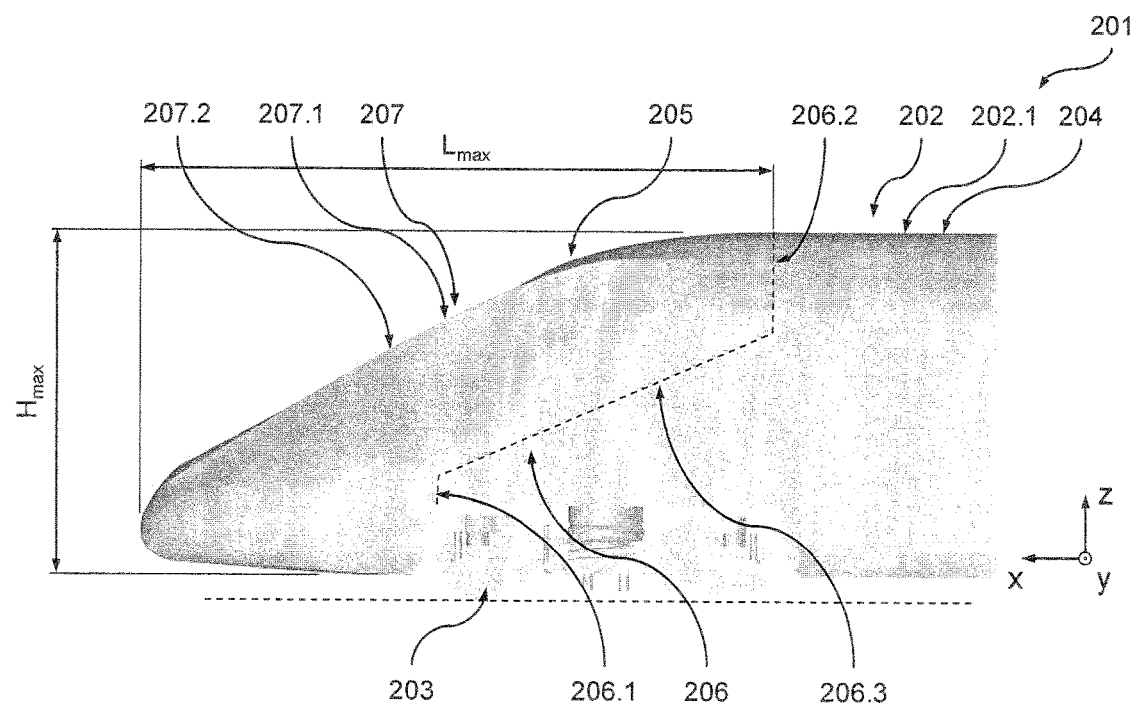
FIG. 8 a schematic side view of the vehicle from FIG. 7.
Figure 9:
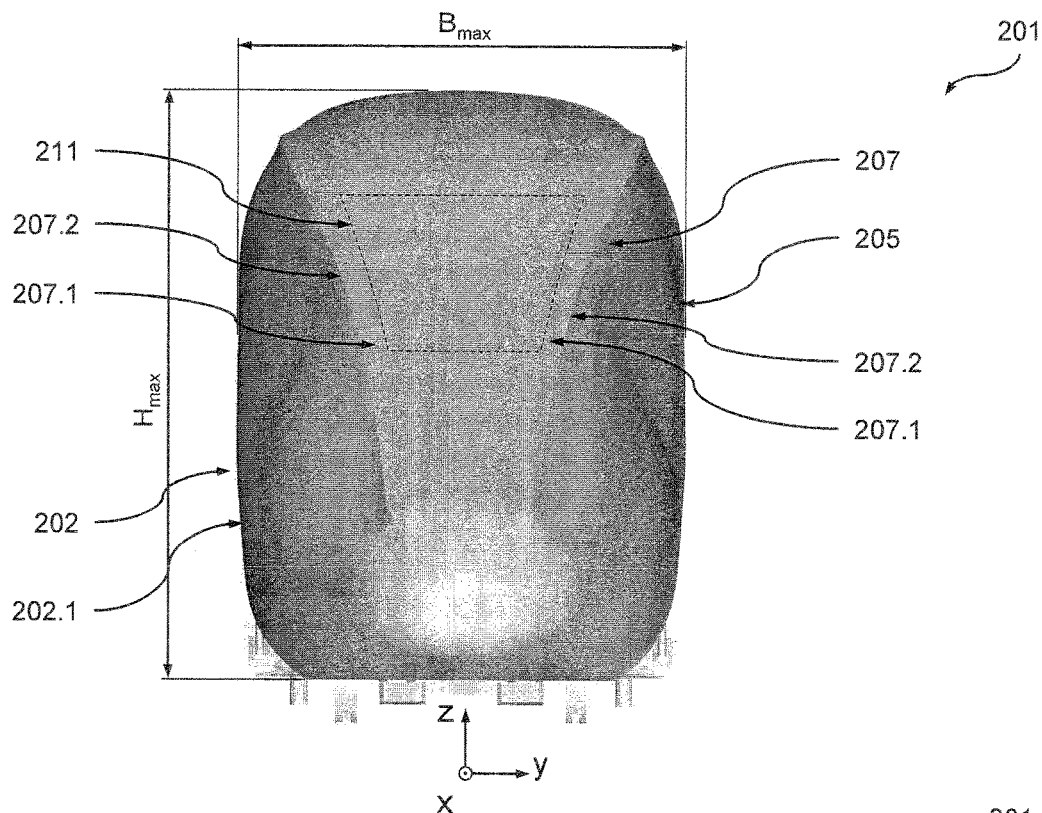
FIG. 9 a schematic front view of the vehicle from FIG. 7.

As can further be seen from FIGS. 7 and 9, the groove-shaped section 207.1 with the roof-like protrusion 207.2 is arranged in a region which lies relatively far outward (in the vehicle transverse direction), outside a windscreen 211 of the head section 205, since it can be created there in a particularly simple manner. Moreover, this relatively far outward position is advantageous as regards the simple creation of the roof-like protrusion 207.2, since the general shape of the head section 205 in this relatively far outward position favours a correspondingly sharp or cliff-like kinking of the outer skin 202.1 in relation to the main direction of flow.

A further advantage of this shape with the two roof-like protrusions 207.2 lies in the fact that, in the present example, a planar windscreen 211 can be produced, making the manufacture thereof extremely simple. However, it will be appreciated that, in other variants of the invention, in this case too a convex contour may be provided between the two roof-like protrusions 207.2, as indicated by the double-dot-dashed contour 212 in FIG. 11. In this case, a respective turning point WP of the contour 212 is once again provided.

The course of the roof-like protrusions 207.1 conforms to the general geometry of the head section 205 in order to achieve, in a manner adapted to the latter, an optimum regarding reduced crosswind sensitivity with low sound development and low resistance to travel.

As can further be seen from FIGS. 7 and 9 in this context, the ridge sections 207.5 of the two roof-like protrusions 207.1 run substantially in a V shape in relation to one another, as seen in a front view in the direction of the vehicle longitudinal axis, wherein they define a concave V shape. This advantageously has the effect of approximating the course of the ridge sections 207.5 or the roof-like protrusions 207.1 to the course of the streamlines when flow is purely axial. This is highly advantageous in that, upon purely axial flow against the wagon body 202, the roof-like protrusions 207.1 do not cause any flow disturbance, in particular as a result of their ridge sections 207.5, with the result that, in the event of purely axial flow or flow that deviates only slightly therefrom, minimal sound development and minimal resistance to travel are produced.

In the present example, the course of the ridge sections 207.5 or the roof-like protrusions 207.1 to this end follows the course of a guide streamline. Here, the guide streamline is a substantially undisturbed streamline which results from flow against the wagon body 202 purely in the vehicle longitudinal direction. In other variants on the invention, it is also possible here to make an adjustment to a conventional reference vehicle having a smoothed, continuously curved reference outer skin without the roof-like protrusion but otherwise of identical shape. The guide streamline is then produced from flow against the reference vehicle purely in the vehicle longitudinal direction.

Another advantageous embodiment of the vehicle 301 according to the invention is described below with reference to FIGS. 6 and 13 to 18D. Here, the basic design and functionality of the vehicle 301 correspond to the vehicle 101 from FIGS. 1 to 5, so only the differences will be discussed here. In particular, like components are provided with reference numerals incremented by a value of 200. Unless stated otherwise below, reference is made to the statements given above in connection with the first embodiment as regards the features, functions and advantages of these components.

The difference from the vehicle 101 consists in the fact that the vehicle 301 is a control car for a double-decker train the nominal operating speed of which is above 180 km/h, namely $v_n$=200 km/h.

In order to increase the crosswind stability of the vehicle 301, once again the head section 305 of the wagon body 302 is provided with a flow separation unit 307 which, upon oblique flow W, at least reduces the unfavourable character (for example unevenness prevailing in the vehicle transverse direction) of the pressure distribution in the region of the head section 305, by a leeside separation of the flow from the outer skin 302.1 at an early stage and in an enduring manner, and, hence, avoids the excessive wheel unloading at the running gear 303 which would otherwise result.

For this purpose, once again the flow separation unit 307 comprises on both sides of the wagon body 302 a respective groove-shaped section 307.1, which is integrated in the outer skin 302.1 and on the outer side (as seen in the vehicle transverse direction) of which a respective, substantially rigid roof-like protrusion 307.2 is defined. The roof-like protrusion 307.2 projects outwards in comparison to the geometry of conventional vehicles having a rounded outer skin as indicated by the dashed contour 308 in FIG. 16. This roof-like protrusion 307.2 is arranged spaced from the vehicle longitudinal centre plane (xz plane) on the lee side upon an oblique flow against the vehicle, and by means of its ridge section 307.5 there forms a flow separation edge for the air flow.

The roof-like protrusion 307.2 is of such a pronounced shape that, at all the travel speeds v that may be achieved in normal operation of the vehicle 301 at which a critical wheel unloading could occur as a result of crosswind (for example in the sense of TSI RS, mentioned at the outset), a reliable and enduring separation of the flow from the outer skin 302.1 is ensured, and consequently the possibility that the flow will re-attach to the outer skin 302.1 downstream (in the direction of flow) of the protrusion 307.2 is reliably prevented. This means that it is possible, for example, despite the comparatively low weight of the vehicle 301, to observe the criteria of crosswind stability as defined for example in TSI RS mentioned at the outset, without having to fall back to conventional aids such as additional ballast or similar, or a reduction in the travel speed at an early stage which is forced by crosswind.

As can be seen in particular from FIGS. 16 and 17, once again the roof-like protrusion 307.2 for this purpose has a first roof section 307.3 facing towards the vehicle longitudinal centre plane (xz plane), a second roof section 307.4 facing away from the vehicle longitudinal centre plane and a sharp-edged ridge section 307.5 (radius of curvature 3 mm, maximum transverse dimension less than 4 mm) which forms a transition between the first roof section 307.3 and the second roof section 307.4. The sectional contour of the first roof section 307.3 and the second roof section 307.4 is at most very slightly curved in the present example, resulting in a geometry of the head section 305 in this region, which is of particularly simple shape and easy to manufacture.

In order to ensure reliable and enduring separation of the air flow upon an oblique flow against the wagon body 302, on the one hand, the first roof section 307.3 and the second roof section 307.4 are arranged in relation to one another such that, upon an oblique flow against the vehicle 301, a main direction of flow is imposed on the air flow by the first roof section 307.3 in the region of the air flow close to the boundary layer. On the other hand, the sectional contour of the outer skin 302.1 (in a sectional plane containing the main direction of flow) in the region of the second roof section 307.4 (in the main direction of flow downstream of the ridge section 307.5) kinks sharply or in the manner of a cliff in relation to the main direction of flow such that the air flow is unable to follow this rapid change in direction of the outer skin 302.1 and is consequently enduringly separated from the outer skin 302.1.

Once again, the first roof section 307.3 and the second roof section 307.4 define a tangential direction T1 and a second tangential direction T2, respectively, which for their part define a roof angle α (between the two roof sections 307.3, 307.4) of the roof-like protrusion 307.2.

In order to achieve the above-described rapid change in direction in the outer skin 302.1 and hence the desired enduring flow separation, the roof angle α, over a first edge region of the roof-like protrusion 307.2 extending in the vehicle longitudinal direction, is less than 120°, as can be seen in particular from the curve 309 in FIG. 6. Here, the curve 309 in FIG. 6 represents the course of the roof angle α (in degrees) for the vehicle 301 over the x coordinate related to the maximum head length $L_{max}$ of the head section 305 (in percent), starting from the vehicle tip (0%).

As can be seen, in particular, from the curve 309, the first edge region extends from approximately 1% to 38% (that is to say over approximately 37%) of the maximum head length $L_{max}$. In a second edge region which extends from approximately 2% to 35% (that is to say over approximately 33%) of the maximum head length $L_{max}$, the roof angle α is less than 110°. In a third edge region which extends from approximately 3% to 31% (that is to say over approximately 28%) of the maximum head length $L_{max}$, the roof angle α is less than 100°. In a fourth edge region which extends from approximately 5% to 28% (that is to say over approximately 22%) of the maximum head length $L_{max}$, the roof angle α is less than 90°. In a fifth edge region which extends from approximately 9% to 22% (that is to say over approximately 13%) of the maximum head length $L_{max}$, the roof angle α is less than 80°. The minimum roof angle $\alpha_{min}=76°$ is achieved in the section illustrated in FIG. 16, which lies at approximately 18% of the maximum head length $L_{max}$.

For the purpose of illustrating the sectional contours of the outer skin 302.1, FIGS. 18A to 18D show parts of the vehicle tip 301.1, which have been cut away at both ends of the first edge region or the second edge region (FIG. 18A at approximately 5% of the maximum head length $L_{max}$, FIG. 18B at approximately 6% of the maximum head length $L_{max}$, FIG. 18C at approximately 32% of the maximum head length $L_{max}$ and FIG. 18D at approximately 37% of the maximum head length $L_{max}$).

As regards the position of the roof-like protrusion 307.2 in the vehicle height direction (z direction), it should be noted that the ridge section 307.5 of the first edge region extends from the vehicle lower edge (0%) from approximately 23% to 72% (that is to say over approximately 49%) of the maximum head height $H_{max}$, wherein the ridge section 307.5 rises towards the body section 304. In the second edge region, the ridge section 307.5 extends from approximately 25% to 69% (that is to say over approximately 44%) of the maximum head height $H_{max}$. In the third edge region the ridge section 307.5 extends from approximately 34% to 65% (that is to say over approximately 31%) of the maximum head height $H_{max}$. In the fourth edge region, the ridge section 307.5 extends from approximately 36% to 64% (that is to say over approximately 28%) of the maximum head height $H_{max}$. In the fifth edge region, the ridge section 307.5 extends from approximately 42% to 55% (that is to say over approximately 13%) of the maximum head height $H_{max}$. The point on the ridge section 307.5 having the minimum roof angle ($\alpha_{min}=76°$; see FIG. 16) lies at approximately 50% of the maximum head height $H_{max}$.

As regards the position of the roof-like protrusion 307.2 in the vehicle transverse direction (y direction), it should be noted that the ridge section 307.5 of the first edge region, seen from the longitudinal centre plane (0%), extends from approximately 28% to 42% (that is to say over approximately 14%) of the maximum head width $B_{max}$, wherein the ridge section 307.5 moves away from the longitudinal centre plane towards the body section 304. In the second edge region, the ridge section 307.5 extends from approximately 29% to 42% (that is to say over approximately 13%) of the maximum head width $B_{max}$. In the third edge region, the ridge section 307.5 extends from approximately 36% to 41.5% (that is to say over approximately 5.5%) of the maximum head width $B_{max}$. In the fourth edge region, the ridge section 307.5 extends from approximately 36.5% to 41% (that is to say over approximately 4.5%) of the maximum head width $B_{max}$. In the fifth edge region, the ridge section 307.5 extends from approximately 37.5% to 39.5% (that is to say over approximately 2%) of the maximum head width $B_{max}$. The point on the ridge section 307.5 having the minimum roof angle ($\alpha_{min}=76°$; see FIG. 16) lies at approximately 39% of the maximum head width $B_{max}$.

In the present example, the outer skin 302.1 forms, in the region of the roof sections 307.3 and 307.4, a substantially smooth surface (with an at most moderate change in curvature in the vehicle transverse direction). The sectional contour of the outer skin 302.1 has, in a sectional plane that runs perpendicular to the vehicle longitudinal direction, a turning point WP which once again defines a wave-shaped sectional contour.

Figure 16:
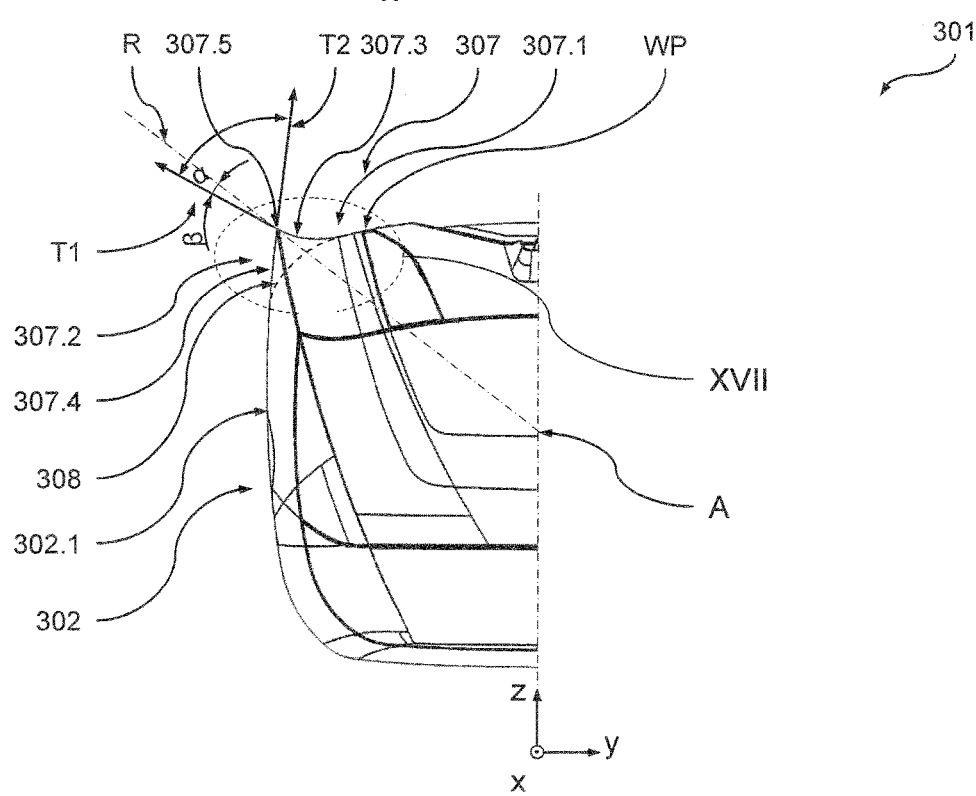
FIG. 16 a schematic front view of part of the vehicle tip of the vehicle from FIG. 13, which has been cut away in a sectional plane that runs perpendicular to the vehicle longitudinal direction.

As can further be seen from FIGS. 16 and 17, in the present example too, the roof-like protrusion 307.2 is shaped and arranged in the manner of a ramp such that a strong flow component directed radially away from the outer skin 302.1 is imposed on the air flow in the region thereof. As can be seen from FIG. 16, in the sense of the present invention, in a vehicle cross-section that runs perpendicular to the vehicle longitudinal direction, the radial direction is once again defined by a line of connection R between a point on the ridge section 307.5 and the centroid A of the vehicle cross-section. In the present example, an angle β of less than 45° is formed between the first tangential direction T1 and the radial direction R over the first edge region. In the section illustrated in FIG. 4, the angle β is approximately 5°.

Figure 13:
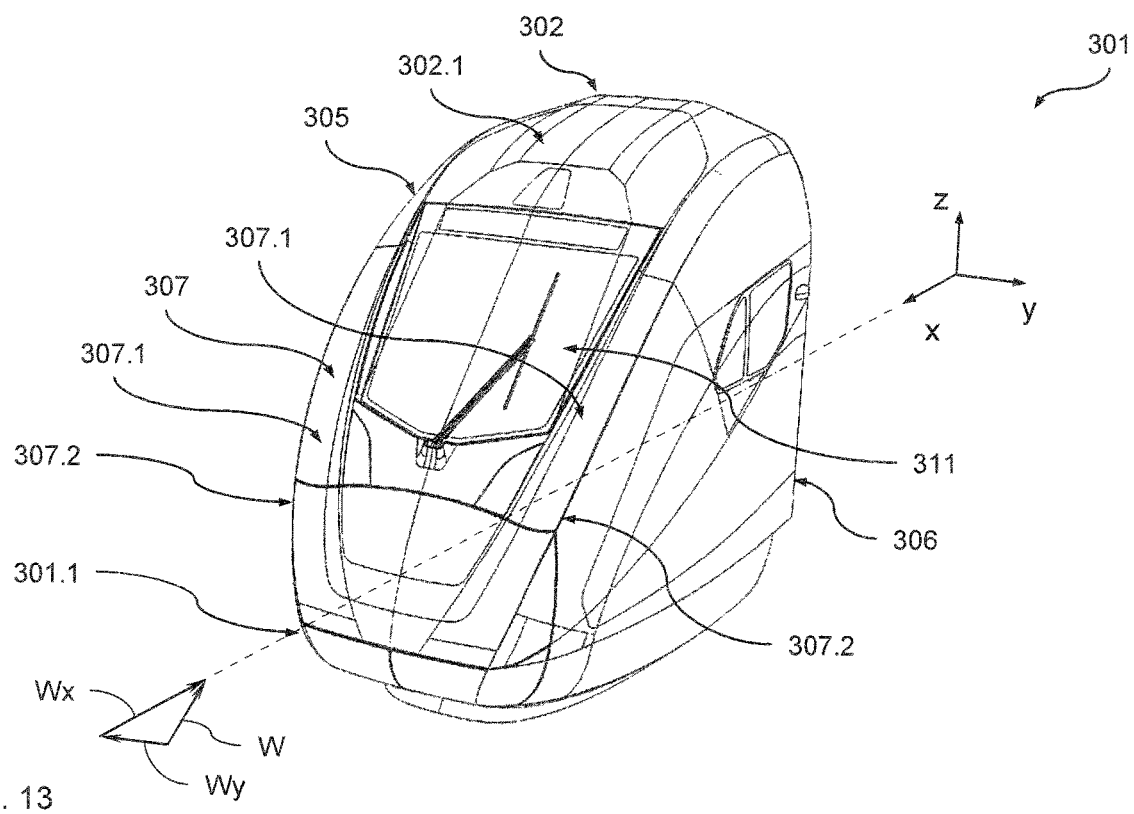
FIG. 13 a schematic perspective view of part of another preferred embodiment of the vehicle according to the invention.
Figure 14:
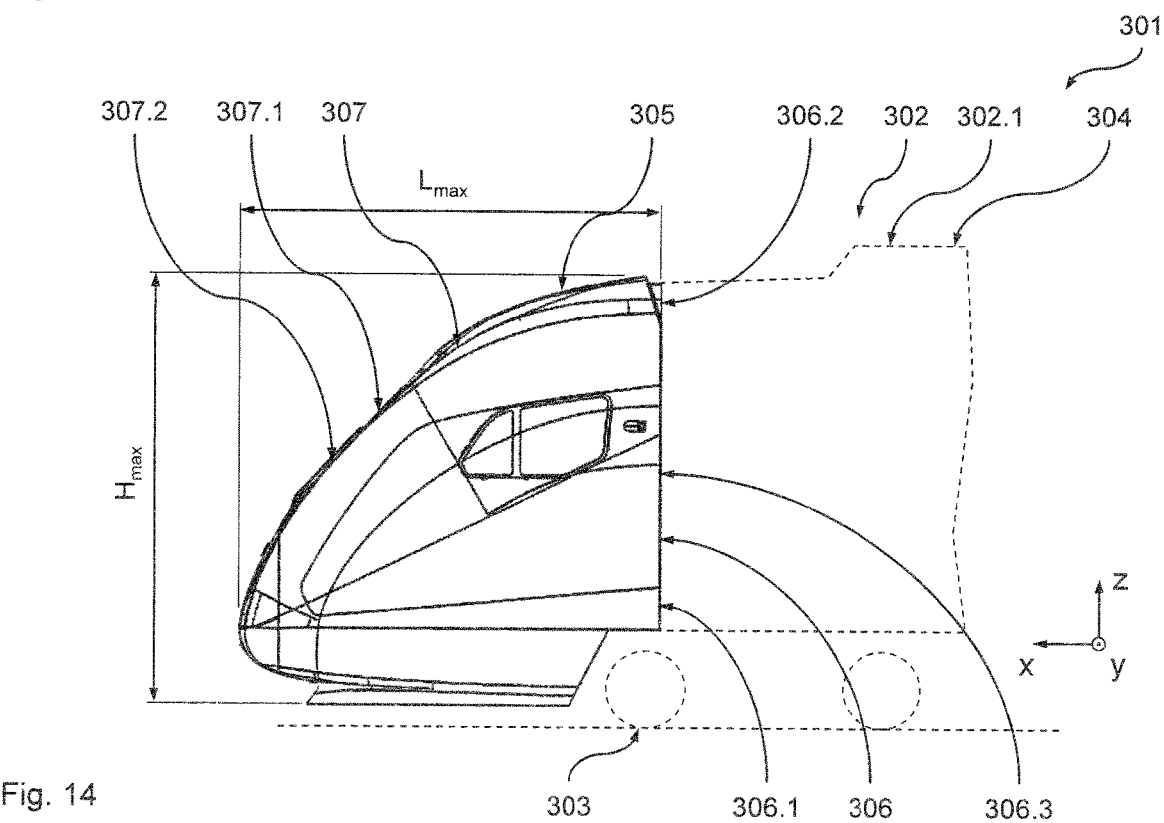
FIG. 14 a schematic side view of the vehicle from FIG. 13.
Figure 15:
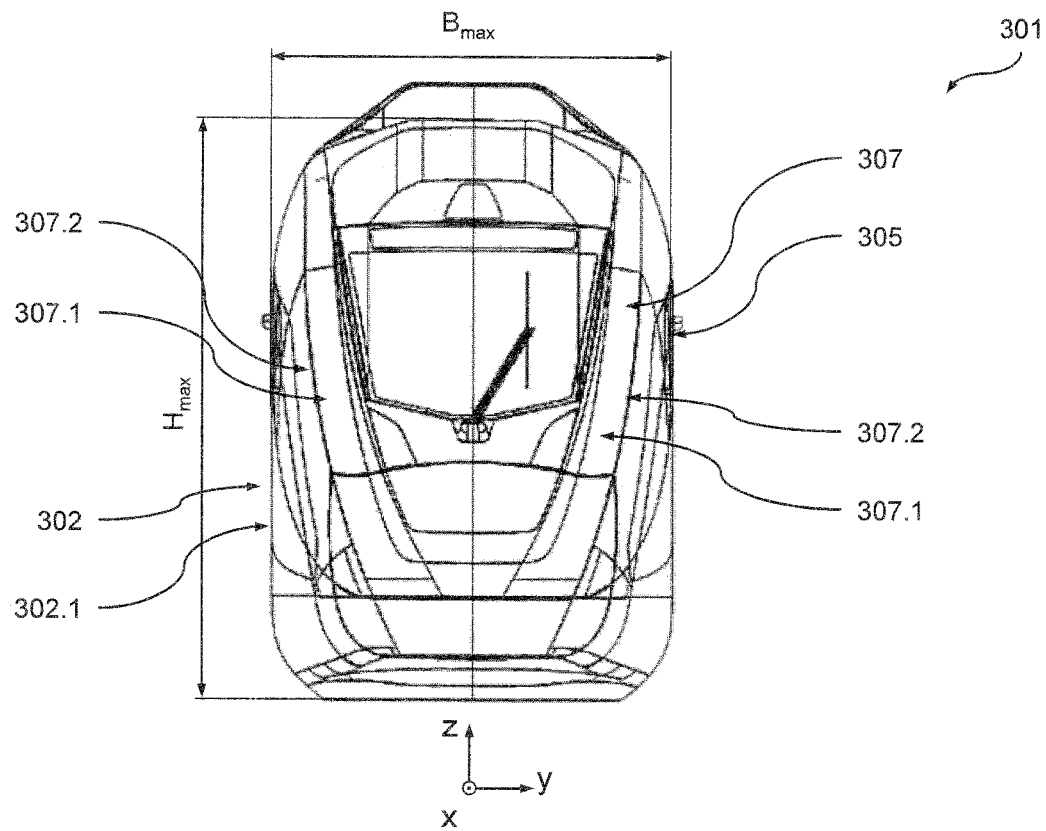
FIG. 15 a schematic front view of the vehicle from FIG. 13.

As can further be seen from FIGS. 13 and 15, the groove-shaped section 307.1 with the roof-like protrusion 307.2 is arranged in a region which lies relatively far outward (in the vehicle transverse direction), outside a windscreen 211 of the head section 305, since it can be created there in a particularly simple manner. Moreover, this relatively far outward position is advantageous as regards the simple creation of the roof-like protrusion 307.2, since the general shape of the head section 305 in this relatively far outward position favours a correspondingly sharp or cliff-like kinking of the outer skin 302.1 in relation to the main direction of flow.

The course of the roof-like protrusions 307.1 follows the general geometry of the head section 305 in order to achieve in a manner adapted thereto an optimum in respect of reduced crosswind sensitivity with low sound development and low resistance to travel.

As can further be seen from FIGS. 13 and 15 in this context, the ridge sections 307.5 of the two roof-like protrusions 307.1 run substantially in a V shape in relation to one another, as seen in a front view in the direction of the vehicle longitudinal axis, wherein they define a convex V shape. This advantageously has the effect of approximating the course of the ridge sections 307.5 or the roof-like protrusions 307.1 to the course of the streamlines when flow is purely axial. This is highly advantageous in that, when flow against the wagon body 302 is purely axial, the roof-like protrusions 307.1 do not cause any flow disturbance, in particular as a result of their ridge sections 307.5, with the result that, in the event of purely axial flow or flow that deviates only slightly therefrom, minimal sound development and minimal resistance to travel are produced.

In the present example, the course of the ridge sections 307.5 or the roof-like protrusions 307.1 to this end follows the course of a guide streamline. Here, the guide streamline is a substantially undisturbed streamline which results from flow against the wagon body 302 purely in the vehicle longitudinal direction. In other variants on the invention, it is also possible here to make an adjustment to a conventional reference vehicle having a smoothed, continuously curved reference outer skin without the roof-like protrusion but otherwise of identical shape. The guide streamline is then produced from flow against the reference vehicle purely in the vehicle longitudinal direction.

The present invention has been described above with reference to three vehicle types for different classes of speed and applications, in which the roof-like protrusions are of different shapes. It will be appreciated that different shapes of the roof-like protrusions may also be provided within a respective vehicle type. Thus, for example, the curve 409 from FIG. 6 shows the course of the roof angle α (in degrees) over the x coordinate related to the maximum head length $L_{max}$ of the head section (in percent), starting from the vehicle tip (0%), for a different high-speed vehicle (having a nominal operating speed above 350 km/h).

It will furthermore be appreciated that the present invention may also be used with vehicles having a lower nominal operating speed. Thus, the present invention is preferably used with vehicles having a nominal operating speed of 140 km/h and above, preferably 160 km/h and above.

The present invention has been described above exclusively in relation to examples of vehicles for multiple unit trains. However, it will be appreciated that the invention may also be used in connection with other rail vehicles. Furthermore, the invention has been described exclusively in connection with rail vehicles. However, it will be appreciated that it may also be used in connection with any other vehicles for increasing crosswind stability.

The invention claimed is:

1. A vehicle comprising:
a wagon body which is supported on at least one running gear, wherein
said wagon body defines a vehicle longitudinal direction, a vehicle transverse direction and a vehicle height direction,
said wagon body has a body section and an adjacent head section,
said head section is configured to form a free vehicle end during operation,
said head section, along said vehicle longitudinal direction, tapers at least in said vehicle height direction towards said free vehicle end,
said head section further has an outer skin and a flow separation unit extending in said vehicle longitudinal direction, said vehicle height direction, or both said vehicle longitudinal direction and said vehicle height direction for reducing sensitivity of said vehicle to crosswind,
wherein
said flow separation unit comprises a roof-like protrusion formed by said outer skin, wherein
said roof-like protrusion, in said vehicle transverse direction, is spaced from a vehicle longitudinal center plane,
said roof-like protrusion has a first roof section facing towards said vehicle longitudinal center plane, a second roof section on a first side of said first roof section distal to said vehicle longitudinal center plane facing away from said vehicle longitudinal center plane, a ridge section forming a transition between said first roof section and said second roof section, and a third roof section on a second side of said first roof section proximal to said vehicle longitudinal center plane and facing away from said vehicle longitudinal center plane,
said first roof section being located between said second roof section and said third roof section in a sectional plane perpendicular to said vehicle longitudinal direction,
said first roof section and said second roof section run inclined to one another such that, at a nominal operating speed of said rail vehicle and with an oblique flow against said roof-like protrusion by an air flow coming from said vehicle longitudinal center plane, said ridge section forms a flow separation edge for said air flow,
said first roof section is configured to impose, in a vehicle transverse plane running perpendicular to said vehicle longitudinal direction, in a first region adjacent to said ridge section, and upon a flow in said vehicle transverse direction coming from said vehicle longitudinal center plane, a first tangential direction on said air flow,
said second roof section is configured to impose, in said vehicle transverse plane, in a second region adjacent to said ridge section, and upon a flow in said vehicle transverse direction towards said vehicle longitudinal center plane, a second tangential direction on said air flow,
said first tangential direction and said second tangential direction define a roof angle of said roof-like protrusion, and
said roof angle, over a first edge region extending in said vehicle longitudinal direction, is less than 150°.

2. The vehicle according to claim 1, wherein
said first roof section, in a vehicle transverse plane running perpendicular to said vehicle longitudinal direction and in said first region adjacent said ridge section, defines a first tangential direction,
said second roof section, in said vehicle transverse plane and in said second region adjacent said ridge section, defines a second tangential direction, wherein
said first tangential direction and said second tangential direction define a roof angle of said roof-like protrusion and
said roof angle, over a first edge region extending in said vehicle longitudinal direction is less than 150°.

3. The vehicle according to claim 1, wherein
said head section, in said vehicle longitudinal direction, has a maximum head length between said free vehicle end and an interface to said body section, and said first edge region, in said vehicle longitudinal direction, extends over at least 15% of said maximum head length,
and
said first edge region begins at a first relative longitudinal spacing from said free vehicle end in said vehicle longitudinal direction, which is at least 2% of said maximum head length,
and
said first edge region ends at a second relative longitudinal spacing from said free vehicle end in said vehicle longitudinal direction, which is at most 80% of said maximum head length.

4. The vehicle according to claim 1, wherein
said head section, in said vehicle height direction, has a maximum head height between a vehicle lower edge and a vehicle upper edge and,
in said vehicle height direction, said first edge region preferably extends over at least 10% of said maximum head height,
and
said first edge region begins at a first relative vertical spacing from said vehicle lower edge in said vehicle height direction, which is at least 15% of said maximum head height,
and
said first edge region ends at a second relative vertical spacing from said vehicle lower edge in said vehicle height direction, which is at most 85% of said maximum head height.

5. The vehicle according to claim 1, wherein
said head section has a maximum head width in said vehicle transverse direction and,
in said vehicle transverse direction, said first edge region extends over at least 10% of said maximum head width,
and
said first edge region begins at a first relative transverse spacing from said vehicle longitudinal center plane in said vehicle transverse direction, which is at least 15% of said maximum head width, and
said first edge region ends at a second relative transverse spacing from said vehicle longitudinal center plane in said vehicle transverse direction, which is at most 30% of said maximum head width.

6. The vehicle according to claim 1, wherein
said ridge section is configured to have an edge in a vehicle transverse plane that runs perpendicular to said vehicle longitudinal direction,
and
said ridge section is configured to be at least section wise rounded in a vehicle transverse plane that runs perpendicular to said vehicle longitudinal direction, wherein a radius of curvature of said ridge section is at most 30 mm,
and
said ridge section, in a vehicle transverse plane that runs perpendicular to said vehicle longitudinal direction, has a maximum transverse dimension of at most 30 mm.

7. The vehicle according to claim 1, wherein,
in a vehicle cross-section of said wagon body that runs perpendicular to said vehicle longitudinal direction, a line of connection between a point on said ridge section and a centroid of said vehicle cross-section defines a radial direction, wherein
said first tangential direction and said radial direction form an angle of less than 60°.

8. The vehicle according to claim 7, wherein
said head section has a maximum head height in said vehicle height direction between a vehicle lower edge and a vehicle upper edge, and
said groove-shaped section, in said vehicle height direction, extends over at least 35% of said maximum head height,
and
said groove-shaped section begins at a third relative vertical spacing from said vehicle lower edge in said vehicle height direction, which is at least 20% of said maximum head height,
and
said groove-shaped section ends at a fourth relative vertical spacing from said vehicle lower edge in said vehicle height direction, which is at most 95% of said maximum head height.

9. The vehicle according to claim 1, wherein
said outer skin of said head section, on a vehicle upper side, in the region of said roof-like protrusion, has a groove-shaped section which, in particular, is arranged in said outer skin of said head section, in a region outside a windscreen of said head section, and
said outer skin, in said groove-shaped section, in a vehicle transverse plane that runs perpendicular to said vehicle longitudinal direction, between a ridge section of said roof-like protrusion and said vehicle longitudinal center plane, has a sectional contour that is substantially continuously curved and has a turning point, wherein said turning point is arranged closer to said ridge section than to said vehicle longitudinal center plane,
or
has a substantially V-shaped kink, wherein said kink is arranged closer to said ridge section than to said vehicle longitudinal center plane.

10. The vehicle according to claim 9, wherein
said head section, in said vehicle longitudinal direction, has a maximum head length between said free vehicle end and an interface to said body section, and
said groove-shaped section, in said vehicle longitudinal direction, extends over at least 30% of said maximum head length,
and
said groove-shaped section begins at a third relative longitudinal spacing from said free vehicle end in said vehicle longitudinal direction, which is at least 2% of said maximum head length,
and
said groove-shaped section ends at a fourth relative longitudinal spacing from said free vehicle end in said vehicle longitudinal direction, which is at most 90% of said maximum head length.

11. The vehicle according to claim 9, wherein
said head section has a maximum head width in said vehicle transverse direction, and
said ridge section delimiting said groove-shaped section, in said vehicle transverse direction, extends over at least 10% of said maximum head width,
and
said ridge section delimiting said groove-shaped section begins at a third relative transverse spacing from said vehicle longitudinal center plane in said vehicle transverse direction, which is at least 15% of said maximum head width,
and
said ridge section delimiting said groove-shaped section ends at a fourth relative transverse spacing from said vehicle longitudinal center plane as seen in said vehicle transverse direction, which is at most 35% of said maximum head width.

12. The vehicle according to claim 1, wherein
said roof-like protrusion is a first roof-like protrusion,
a second roof-like protrusion is provided on said outer skin on an other side of said vehicle longitudinal center plane, and
said second roof-like protrusion is configured to be substantially symmetric to said first roof-like protrusion in relation to said vehicle longitudinal center plane.

13. The vehicle according to claim 12, wherein
said first roof-like protrusion and said second roof-like protrusion, in a front view in said direction of said vehicle longitudinal axis, run substantially in a V shape in relation to one another, wherein
said first roof-like protrusion and said second roof-like protrusion, in said front view, define a convex V shape, or
said first roof-like protrusion and said second roof-like protrusion, in said front view, define a concave V shape.

14. The vehicle according to claim 1, wherein
said vehicle is a vehicle for high-speed traffic, having a nominal operating speed of at least 250 km/h, and
said vehicle is a double-decker vehicle, and
said vehicle is a vehicle for a multiple unit train.

15. The vehicle according to claim 1, wherein said roof angle, over said first edge region, is less than 120°.

16. A vehicle comprising:
a wagon body which is supported on at least one running gear, wherein
said wagon body defines a vehicle longitudinal direction, a vehicle transverse direction and a vehicle height direction,
said wagon body has a body section and an adjacent head section,
said head section is configured to form a free vehicle end during operation,
said head section, along said vehicle longitudinal direction, tapers at least in said vehicle height direction towards said free vehicle end,
said head section further has an outer skin and a flow separation unit extending in said vehicle longitudinal direction, said vehicle height direction, or both said vehicle longitudinal direction and said vehicle height direction for reducing sensitivity of said vehicle to crosswind,
wherein
said flow separation unit comprises a roof-like protrusion formed by said outer skin, wherein
said roof-like protrusion, in said vehicle transverse direction, is spaced from a vehicle longitudinal center plane,
said roof-like protrusion has a first roof section facing towards said vehicle longitudinal center plane, a second roof section on a first side of said first roof section distal to said vehicle longitudinal center plane facing away from said vehicle longitudinal center plane, a ridge section forming a transition between said first roof section and said second roof section, and a third roof section on a second side of said first roof section proximal to said vehicle longitudinal center plane and facing away from said vehicle longitudinal center plane,
said first roof section being located between said second roof section and said third roof section in a sectional plane perpendicular to said vehicle longitudinal direction,
said first roof section and said second roof section run inclined to one another such that, at a nominal operating speed of said rail vehicle and with an oblique flow against said roof-like protrusion by an air flow coming from said vehicle longitudinal center plane, said ridge section forms a flow separation edge for said air flow,
said first roof section, in a vehicle transverse plane running perpendicular to said vehicle longitudinal direction and in said first region adjacent said ridge section, defines a first tangential direction,
said second roof section, in said vehicle transverse plane and in said second region adjacent said ridge section, defines a second tangential direction,
said first tangential direction and said second tangential direction define a roof angle of said roof-like protrusion, and
said roof angle, over a first edge region extending in said vehicle longitudinal direction, is less than 150°.

17. The vehicle according to claim 16, wherein said roof angle, over said first edge region, is less than 120°.

* * * * *

UNITED STATES PATENT AND TRADEMARK OFFICE
CERTIFICATE OF CORRECTION

PATENT NO.            : 10,836,408 B2                                                        Page 1 of 1
APPLICATION NO.  : 13/643726
DATED                   : November 17, 2020
INVENTOR(S)         : Martin Schober et al.

It is certified that error appears in the above-identified patent and that said Letters Patent is hereby corrected as shown below:

On the Title Page

Item (73), Assignee, Line 1, Delete "Bambardier" and insert -- Bombardier --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*